US012692180B2

(12) United States Patent
Hernandez Sanchez et al.

(10) Patent No.: US 12,692,180 B2
(45) Date of Patent: Jul. 28, 2026

(54) METHOD OF CHELATING ANIONS FROM A LIQUID USING A COMPOSITION COMPRISING AT LEAST ONE MACROCYCLIC HOSTING MOIETY

(71) Applicant: University of Pittsburgh—Of the Commonwealth System of Higher Education, Pittsburgh, PA (US)

(72) Inventors: Raul Hernandez Sanchez, Houston, TX (US); Saber Mirzaei, Houston, TX (US); Swati Arora, Florence, SC (US); Victor Manuel Espinoza Castro, Houston, TX (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 567 days.

(21) Appl. No.: 18/101,092

(22) Filed: Jan. 24, 2023

(65) Prior Publication Data

US 2023/0234865 A1 Jul. 27, 2023

Related U.S. Application Data

(60) Provisional application No. 63/302,923, filed on Jan. 25, 2022.

(51) Int. Cl.
*C02F 1/68* (2023.01)
*C02F 101/14* (2006.01)

(52) U.S. Cl.
CPC .......... *C02F 1/683* (2013.01); *C02F 2101/14* (2013.01)

(58) Field of Classification Search
CPC .. C02F 1/683; C02F 2101/14; C02F 2101/36; C02F 1/44
See application file for complete search history.

(56) References Cited

U.S. PATENT DOCUMENTS

| | | | |
|---|---|---|---|
| 8,987,538 | B2 | 3/2015 | Jasti |
| 9,090,473 | B2 | 7/2015 | Jasti |
| 2022/0033410 | A1 | 2/2022 | Shanchez |

OTHER PUBLICATIONS

Choi et al., Rigid Macrocyclic Triamides as Anion Receptors: Anion-Dependent Binding Stoichiometries and 1H Chemical Shift Changes, J. Am. Chem. Soc. 2003, 125, 34, 10241-10249. (Year: 2003).*

Sessler et al. (Sapphyrins-versatile anion binding agents, Acc. Chem. Res., 2001, 34, 989-997). (Year: 2001).*

Sansone et al. (Biomimetic macrocyclic receptors, PNAS, 2002, 99(8), 4842-4847). (Year: 2002).*

J. A. Bryant; M. T. Blanda; M. Vincenti; D. J. Cram, Guest Capture during Shell Closure. J. Am. Chem. Soc. 1991, 113, 2167.

(Continued)

*Primary Examiner* — Hayden Brewster
(74) *Attorney, Agent, or Firm* — BARTONY & ASSOCIATES, LLC

(57) ABSTRACT

A method of sequestering anions from a liquid including the anions includes contacting a composition comprising at least one macrocyclic moiety with the liquid. The macrocyclic moiety includes groups including an electropositive E-H bond donor extending into a cavity of the macrocyclic moiety wherein E is selected from the group consisting of C, N, and O, wherein two or more groups including an electropositive E-H donor interact with an anion to form a chelate with the anion.

23 Claims, 11 Drawing Sheets

(56) References Cited

OTHER PUBLICATIONS

C. B. Aakeröy; P. D. Chopade; N. Schultheiss; J. Desper. Versatile Launch Pad for Facile Functionalization of Cavitands. Eur. J. Org. Chem. 2011, 2011, 6789.

Y. Liu, A. Sengupta, K. Raghavachari and A. H. Flood, Anion Binding in Solution: Beyond the Electrostatic Regime, Chem., 2017, 3, 411-427.

Yang, Anna et al., Cyclodextrin Polymers with Nitrogen-Containing Tripodal Crosslinkers for Efficient PFAS Adsorption, ACS Materials Lett. 2020, 2, 1240-1245.

Xiao, Leilei et al., β Cyclodextrin Polymer Network Sequesters Perfluorooctanoic Acid at Environmentally Relevant Concentrations, J. Am. Chem. Soc. 2017, 139, 7689-7692.

Skala, Luke et al., Resorcinarene Cavitand Polymers for the Remediation of Halomethanes and 1,4-Dioxane, J. Am. Chem. Soc. 2019, 141, 13315-13319.

Alsbaiee, Alaaeddin et al., Rapid removal of organic micropollutants from water by a porous β-cyclodextrin polymer, Nature, vol. 529, 2016, 190-206.

Thordarson, Pall, Determining association constants from titration experiments in supramolecular chemistry, Chem. Soc. Rev., 2011, 40, 1305-1323.

Nielsen, M. B. et.al., Binding Studies between Tetrathiafulvalene Derivatives and Cyclobis(paraquat-p-phenylene), J. Org. Chem. 2001, 66, 3559-3563.

Spek, A. L., Single-crystal structure validation with the program PLATON, J. Appl. Cryst. (2003), 36, 7-13.

Spek, A. L, Structure validation in chemical crystallography, Acta Cryst. (2009). D65, 148-155.

Sheldrick, G. M. SHELXT—Integrated space-group and crystal-structure determination, Acta Cryst. (2015), A71, 3-8.

Sheldrick, G. M. Crystal structure refinement with SHELXL, Acta Cryst. (2015). C71, 3-8.

Dolornanov, O.V. et al., OLEX2: A complete structure solution, refinement and analysis program, J. Appl. Cryst. (2009). 42, 339-341.

Zhao, Y. et al., The M06 suite of density functionals for main group thermochemistry, thermochemical kinetics, noncovalent interactions, excited states, and transition elements: two new functionals and systematic testing of four M06-class functionals and 12 other functionals. Theor Chem Account (2008) 120, 215-241.

Barone, V. et.al. Quantum Calculation of Molecular Energies and Energy Gradients in Solution by a Conductor Solvent Model. J. Phys. Chem. A 1998, 102, 1995-2001.

Cossi, M. et.al. Energies, structures, and electronic properties of molecules in solution with the C-PCM salvation model. Journal of Computational Chemistry, 2003, vol. 24, No. 669-681.

Hirshfeld, F. L. Bonded-atom fragments for describing molecular charge densities. Theoret. Claim. Acta (Berl.) (1977), 44, 129-138.

Mirzaei, S. et al. Predicting the regioselectivity of nucleophilic addition to arynes using frontier molecular orbital contribution analysis. Tetrahedron Lett. 2017, 58, 3362-3365.

Liu, Y. et.al. Chloride capture using a C-H hydrogen-bonding cage. Science (2019), 365, 159-161.

http://supramolecular.org/, Year 2021, Convergent Bio-Nano Science & technology, Faculty of Science, School of Chemistry, Mark Wainwright Analytical Center, Australia.

Andre, Etienne et al.; A New, Simple and Versatile Strategy for the Synthesis of Short Segments of Zigzag-Type Carbon Nanotubes; Chem. Eur. J. 2016; 22; 3105-3114.

Timmerman, Peter et al.; Resorcinarenes, Tetrahedron Report No. 390; Tetrahedron, vol. 52, No. 8, pp. 2663-2704, 1996.

Tunstad, Linda M. et al.; Host-Guest Complexation. 48. Octol Building Blocks for Cavitands and Carcerands; J. Org. Chem. 1989,54, 1305-1312.

Li, Yuanming et al., Chemical Synthesis of Carbon Nanorings and Nanobelts, Acc. Mater. Res. 2021, 2, 681-691.

Li, Yuanming et al., A Nonalternant Aromatic Belt: Methylene-Bridged [6] Cycloparaphenylene Synthesized from Pillar[6]arene, J. Am. Chem. Soc. 2020, 142, 12850-12856.

Li, Ke et al., Overcrowded Ethylene-Bridged Nanohoop Dimers: Regioselective Synthesis, Multiconfigurational Electronic States, and Global Hückel/Möbius Aromaticity, J. Am. Chem. Soc. 2021, 143, 20419-20430.

Ikemoto, Koki et al., A nitrogen-doped nanotube molecule with atom vacancy defects, Nature Communications, 11, Article No. 1807, 2020, 1-6, https://www.nature.com/articles/s41467-020-15662-6.

Matsuno, Taisuke et al., Stereoselectivity in spontaneous assembly of rolled incommensurate carbon bilayers, Nature Communications, 12, Article No. 1575, 2021, 1-8, https://www.nature.com/articles/s41467-021-21889-8.

Cheung, Kwan Yin et al., Synthesis of a zigzag carbon nanobelt, Nature Chemistry, vol. 13, Mar. 2021, 255-259.

* cited by examiner 1 2 3 4 5 6 7 8 9 10

9

10

PEI

6 [MeSO$_3$⊂6]$^-$

METHOD OF CHELATING ANIONS FROM A LIQUID USING A COMPOSITION COMPRISING AT LEAST ONE MACROCYCLIC HOSTING MOIETY

CROSS-REFERENCE TO RELATED APPLICATIONS

This application claims benefit of U.S. Provisional Patent Application Ser. No. 63/302,923, filed Jan. 25, 2022, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Macrocyclic arenes are compounds of interest in the development of host-guest chemistry. Guests are usually hosted within the inner cavity of the macrocycle through non-covalent interactions, e.g., hydrogen bonding, n-n stacking, and C—H•••π interactions. Among these non-covalent interactions, hydrogen bonding is the strongest one, especially when considering oxygen and nitrogen, where the difference in Pauling electronegativity with hydrogen ($\Delta\chi$) is 1.24 and 0.84, respectively. It has been recognized that incorporating hydrogen bonding capabilities (N—H bonds) within cryptands resulted in weak-to-medium affinity for spherical anions (for example, halides). That realization opened the door to "anion coordination chemistry". Macrocycles hosting fluoride ion purely through C—H•••$F^-$ hydrogen bonding have been reported, which is remarkable noting that $\Delta\chi$ for C and H is just 0.35. However, because of the relatively weak binding affinities, molecular designs for anion binding based solely on C—H hydrogen bonding have been marginalized in supramolecular host-guest chemistry. That notion has been challenged, and in the past few decades a range of hosts with remarkable affinities towards spherical anions (anion association constant, $K_a>10^6\ M^{-1}$) have been reported. Despite such noteworthy advances, hosts capable of binding nonspherical anions with high affinity are rare, and efforts to develop novel hosts for large nonspherical anions remains a significant challenge.

Hosts capable of binding sulfonates and carboxylates are highly desired as such anions are the anionic heads within PFAS, which are per- and polyfluorinated substances (PFAS) comprising greater than 9000 different molecules. PFAS include, for example, PFNA (perfluorononanoic acid), PFOA (perfluorooctanoic acid), PFDA (perfluorodecanoic acid), PFHxS (perfluomhexane sulfonate), PFHxA (perfluorohexanoic acid), PFDA (perfluorodecanoic acid), PFOS (perfluorooctane sulfonic acid), and PFBS (perfluorobutane sulfonic acid). PFAS are extensively used in consumer and industrial products and are extremely resistant to environmental degradation, hence their common name "forever chemicals". Certain PFAS have been shown to have a relatively long half-life in humans (for example, in the range of 3.8 to 8.5 years) and can lead to significant adverse health effects. PFAS have been found in drinking water sources across the US as shown by maps developed from research by the Environmental Working Group (EWG) and the PFAS Project at Northeastern University's Social Science Environmental Health Research Institute (SSEHRI). The health-related problems of PFAS has recently increased the regulatory scrutiny by the U.S. Environmental Protection Agency (EPA) and other agencies around the world. A common advisory limit of 70 ppt in drinking water has been established for PFAS.

SUMMARY

In one aspect, a method of sequestering anions from a liquid including the anions includes contacting a composition including at least one macrocyclic moiety with the liquid. The macrocyclic moiety includes groups including an electropositive E-H bond donor extending into a cavity of the macrocyclic moiety wherein E is selected from the group consisting of C, N, and O, and wherein two or more groups including an electropositive E-H bond donor interacting with an anion to form a chelate with the anion. As used herein, the term "chelate" refers to any adduct formed between a guest entity and a surrounding host. The guest may be anion or other similarly interacting species. The host herein is the macrocycle moiety, which provides two or more sites (that is, the host/ligand is polydentate) for host: guest interaction.

The groups including an electropositive E-H bond donor extending into the cavity of the macrocyclic moiety may, for example, be aromatic groups, amine groups, amide groups, urea groups, or thiourea groups. In a number of embodiments, the groups including an electropositive E-H bond donor extending into the cavity of the macrocyclic moiety are aromatic groups or heterocyclic aromatic groups.

In a number of embodiments, the macrocyclic moiety exhibits an affinity toward anions that are non-spherical anions. In a number of embodiments, the macrocyclic moiety exhibits an affinity for anions that are large anions. As used herein, the term "large anions" refers to anions have thermochemical radii equal to or larger than that of the iodide anion V, which has a thermochemical radius of 2.11 Å. The macrocyclic moiety may, for example, have an affinity for at least one of sulfonates and carboxylates.

A plurality of the macrocyclic moieties may, for example, be immobilized upon a surface or covalently incorporated within a polymer. In embodiments in which the macrocyclic moieties or hosts are immobilized on a surface, the host may, for example, be grafted to or fixed into a solid support (for example, on surfaces of suspended particles, a surface of a material, etc.). In a number of embodiments, the plurality of the macrocyclic moieties are incorporated within the polymer. In a number of embodiments, the groups including the electropositive E-H bond donor extending into a cavity of the macrocyclic moiety are conformationally constrained.

The macrocyclic moiety may, for example, be synthesized by providing an end group including a macrocyclic compound that is sufficiently rigid that it presents a plurality of functional groups extending from a first axial side of the end group and reacting a plurality of reactive compounds with the plurality of functional groups extending from the first axial side of the end group, wherein each of the plurality of reactive compounds is a precursor for one of the groups including an electropositive E-H bond donor and includes a functional group reactive with at least one of the plurality of functional groups extending from the first axial side of the end group, and wherein each of the reactive compounds includes at least one electron withdrawing substituent and one of the electropositive E-H donors. The macrocyclic compound may, for example, be a resorcin[n]arene wherein n is an integer between 4 and 8, a bridged resorcin[n']arene wherein n' is an integer between 4 and 8, a calix[n"]pyrrole-resorcinarene wherein n" is 4, and a calix[n'"]arene wherein n'" is an integer between 4 and 6.

In a number of embodiments, each of the groups including an electropositive E-H bond donor has the formula:

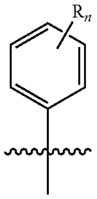

wherein $R_n$ is an electron withdrawing group. $R_n$ may, for example, be selected from the group of F, —CN, —$NO_2$, $SO_2CF_3$, $NR_3^+$, $SO_3H$, $SO_2R$, —COR, $CO_2H$, —$CO_2R$, —$CONH_2$, —CONHR, and —$CONR_2$, wherein R is an alkyl group having one and up to 20 carbon atoms, or an aryl group with or without substituents, where substituents may include any one or combinations of the following groups F, —CN, —$NO_2$, $SO_2CF_3$. In a number of embodiments, R is selected from the group of F, —CN, and —$NO_2$. In a number of embodiments, each of the groups including an electropositive E-H bond donor has the formula:

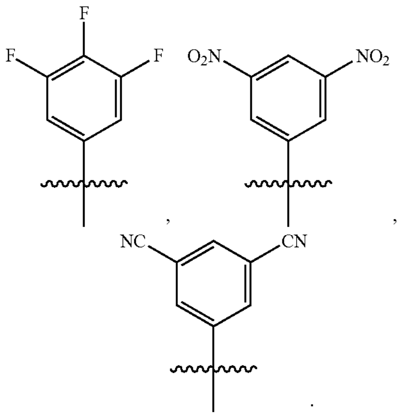

In a number of embodiments, the macrocyclic moiety is a resorcin[n]arene wherein n is 4.

The macrocyclic compound may, for example, be generally cylindrical or ellipsoidal. The macrocyclic compound may, for example, include arene groups.

In a number of embodiments, the plurality of functional groups extending from the first axial side of the end group are selected from the group consisting of halide groups, boronate esters, and acetylenic groups. The boronate ester may, for example, be a Bpin group. The macrocyclic compound may further include a plurality of functional groups on a second axial side of the macrocyclic compound. In a number of embodiments, the plurality of functional groups on a second axial side of the macrocyclic compound are selected from the group consisting of alkyl group, an aryl group, an aldehyde group, an alkyl halide, an alcohol group, an ether group, an alkyl epoxide, an olefinic group, an acetylenic group, carboxylic group, or a polymeric group (for example, a hydrophilic polymeric or oligomeric group). At least a portion of the plurality of functional groups on a second axial side of the macrocyclic compound may, for example, be selected to react in a polymerization reaction.

In a number of embodiments, the macrocyclic compound is:

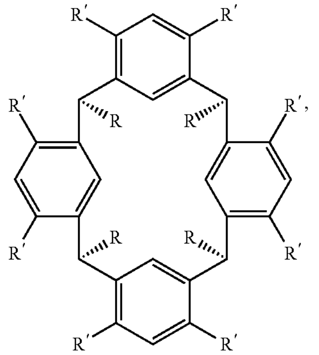

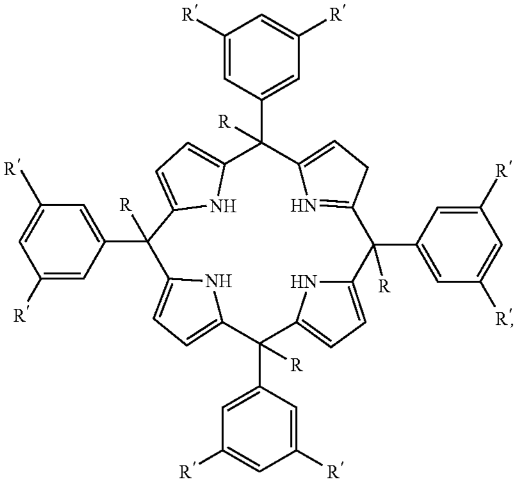

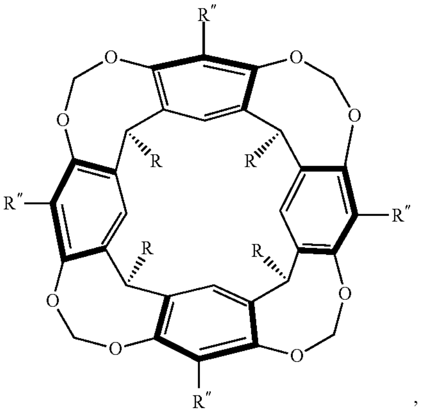

, or

-continued

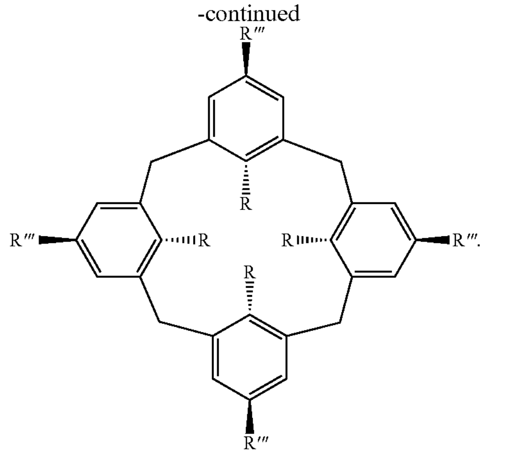

wherein R' is a hydroxyl group or an alkoxy group, R" is a halide, a boronate ester group, an acetylenic group, an amine group, an amide group, a urea group, a thiourea group, an aldehyde group, or a carboxylic group, R''' is a halide, a hydroxyl group, an alkoxy group, an amine group, an aldehyde group, an imine group, or a carboxylic group, and R is an alkyl group, an aryl group, an aldehyde group, an alkyl halide, an alcohol group, an ether group, an alkyl epoxide group, an olefinic group, an acetylenic group, carboxylic group, or a polymeric group.

The anions to be sequestered may, for example, be perfluorinated compounds and polyfluorinated compounds. The macrocyclic moieties may also interact with neutral compounds to sequester a neutral compound. The neutral compounds may, for example, be polyfluorinated compounds or and polyfluorinated compounds.

A plurality of the macrocyclic moieties of different ring size may, for example, be immobilized upon a surface or covalently incorporated within a polymer to sequester anions (and/or neutral compounds) of different size.

In another aspect, a composition, includes at least one macrocyclic moiety, wherein the macrocyclic moiety includes groups having an electropositive E-H bond donor extending into a cavity of the macrocyclic moiety. E is selected from the group consisting of C, N, and O. Two or more groups including an electropositive E-H donor to interact with an entity to be hosted by the macrocyclic moiety. The composition may otherwise be characterized as described above and elsewhere herein.

As described above, the groups including an electropositive E-H bond donor extending into the cavity of the macrocyclic moiety may, for example, be aromatic groups, amine groups, amide groups, urea groups, or thiourea groups. In a number of embodiments, the groups including an electropositive E-H bond donor extending into the cavity of the macrocyclic moiety are aromatic groups or heterocyclic aromatic groups.

In a number of embodiments, the macrocyclic moiety exhibits an affinity toward anions that are non-spherical anions. In a number of embodiments, the macrocyclic moiety exhibits an affinity for anions that are large anions. The macrocyclic moiety may, for example, have an affinity for at least one of sulfonates and carboxylates.

A plurality of the macrocyclic moieties may, for example, be immobilized upon a surface or covalently incorporated within a polymer. The macrocyclic moieties or hosts may, for example, be immobilized on a surface, the host may, for example, be grafted to or fixed into a solid support (for example, on surfaces of suspended particles, a surface of a material, etc.). In a number of embodiments, the plurality of the macrocyclic moieties are incorporated within the polymer. In a number of embodiments, the groups including the electropositive E-H bond donor extending into a cavity of the macrocyclic moiety are conformationally constrained.

The macrocyclic moiety may, for example, be synthesized by providing an end group including a macrocyclic compound that is sufficiently rigid that it presents a plurality of functional groups extending from a first axial side of the end group and reacting a plurality of reactive compounds with the plurality of functional groups extending from the first axial side of the end group, wherein each of the plurality of reactive compounds is a precursor for one of the groups including an electropositive E-H bond donor and includes a functional group reactive with at least one of the plurality of functional groups extending from the first axial side of the end group, and wherein each of the reactive compounds includes at least one electron withdrawing substituent and one of the electropositive E-H donors. The macrocyclic compound may, for example, be a resorcin[n]arene wherein n is an integer between 4 and 8, a bridged resorcin[n']arene wherein n' is an integer between 4 and 8, a calix[n" ]pyrrole-resorcinarene wherein n" is 4, and a calix[n''']arene wherein n''' is an integer between 4 and 6.

In a number of embodiments, each of the groups including an electropositive E-H bond donor has the formula:

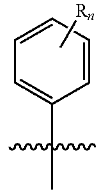

wherein $R_n$ is an electron withdrawing group. $R_n$ may, for example, be selected from the group of F, —CN, —$NO_2$, $SO_2CF_3$, $NR_3^+$, $SO_3H$, $SO_2R$, —COR, $CO_2H$, —$CO_2R$, —$CONH_2$, —CONHR, and —$CONR_2$, wherein R is an alkyl group having one and up to 20 carbon atoms, or an aryl group with or without substituents, where substituents may include any one or combinations of the following groups F, —CN, —$NO_2$, $SO_2CF_3$. In a number of embodiments, $R_n$ is selected from the group of F, —CN, and —$NO_2$. In a number of embodiments, each of the groups including an electropositive E-H bond donor has the formula:

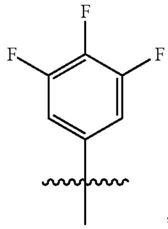

,

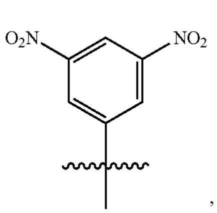

, or

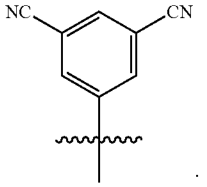

.

In a number of embodiments, the macrocyclic moiety is a resorcin[n]arene wherein n is 4.

The macrocyclic compound may, for example, be generally cylindrical or ellipsoidal. The macrocyclic compound may, for example, include arene groups.

In a number of embodiments, the plurality of functional groups extending from the first axial side of the end group are selected from the group consisting of halide groups, boronate esters, and acetylenic groups. The boronate ester may, for example, be a Bpin group. The macrocyclic compound may further include a plurality of functional groups on a second axial side of the macrocyclic compound. In a number of embodiments, the plurality of functional groups on a second axial side of the macrocyclic compound are selected from the group consisting of alkyl group, an aryl group, an aldehyde group, an alkyl halide, an alcohol group, an ether group, an alkyl epoxide, an olefinic group, an acetylenic group, carboxylic group, or a polymeric group (for example, a hydrophilic polymeric or oligomeric group). At least a portion of the plurality of functional groups on a second axial side of the macrocyclic compound may, for example, be selected to react in a polymerization reaction.

In a number of embodiments, the macrocyclic compound is:

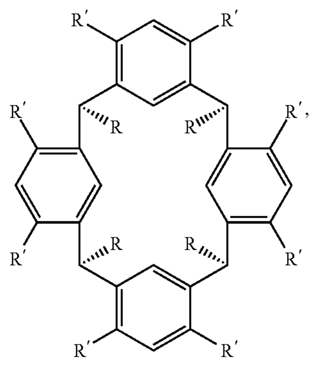

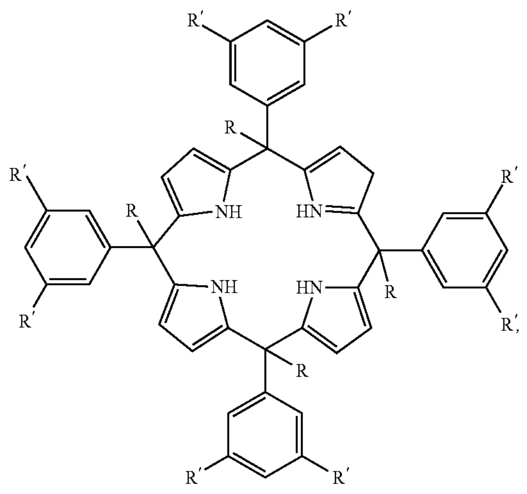

-continued

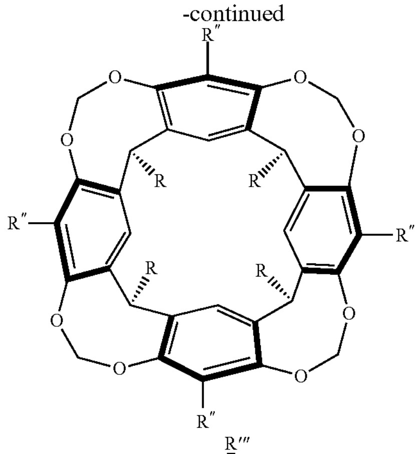

, or

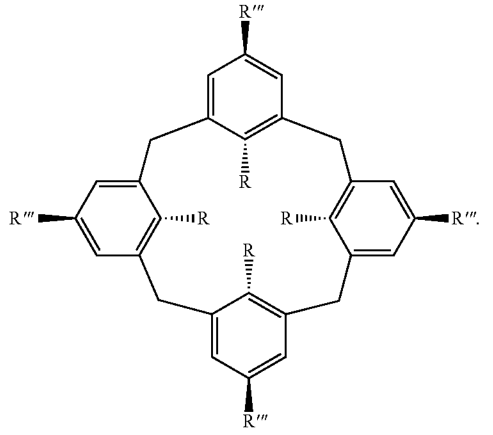

wherein R' is a hydroxyl group or an alkoxy group, R" is a halide, a boronate ester group, acetylenic group, an amine group, an amide group, a urea group, a thiourea group, an aldehyde group, or a carboxylic group, R'" is a halide, a hydroxyl group, an alkoxy group, an amine group, an aldehyde group, an imine group, or a carboxylic group, and R is an alkyl group, an aryl group, an aldehyde group, an alkyl halide, an alcohol group, an ether group, an alkyl epoxide group, an olefinic group, an acetylenic group, carboxylic group, or a polymeric group.

The anions to be sequestered may, for example, be perfluorinated compounds and polyfluorinated compounds. The macrocyclic moieties may also interact with neutral compounds to sequester a neutral compound. The neutral compounds may, for example, be polyfluorinated compounds or and polyfluorinated compounds.

A plurality of the macrocyclic moieties of different ring size may, for example, be immobilized upon a surface or covalently incorporated within a polymer to sequester anions (and/or neutral compounds) of different size.

In a further aspect, a composition has the formula set forth in FIG. 1B, wherein $R_n$ is an electron withdrawing group, and wherein R is an alkyl group, aryl group, aldehyde, alkyl halide, alcohol, ether group, alkyl epoxide, olefinic, or carboxylic group. $R_n$ may, for example, be F, —CN, —$NO_2$, $SO_2CF_3$, $NR_3$+, $SO_3H$, $SO_2R$, —COR, $CO_2H$, —$CO_2R$, —$CONH_2$, —CONHR, of —$CONR_2$, wherein R is an alkyl group having one and up to 20 carbon atoms, or an aryl group with or without substituents, where substituents may include any one or combinations of the following groups F, —CN, —$NO_2$, $SO_2CF_3$. In a number of embodiments, $R_n$ is selected from the group of F, —CN, and —$NO_2$. The aromatic flanking groups of the composition may, for example, have the formula:

2

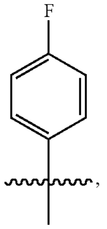

,

3

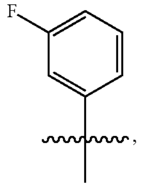

,

4

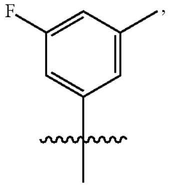

,

5

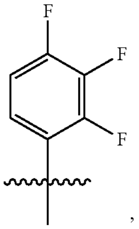

,

6

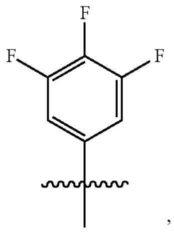

,

7

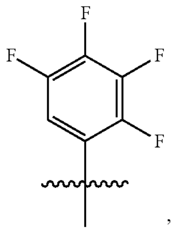

,

8

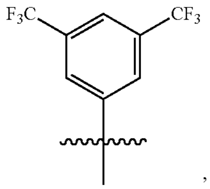

,

-continued

9

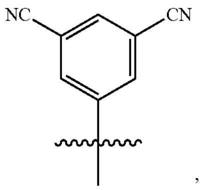

, or

10

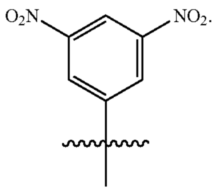

In still a further aspect, a method of hosting a molecule includes contacting a composition including at least one macrocyclic moiety with the molecule. The macrocyclic moiety includes groups having an electropositive E-H bond donor extending into a cavity of the macrocyclic moiety, wherein E is selected from the group consisting of C, N, and O, and wherein two or more groups including an electropositive E-H donor interact with the molecule to form a chelate with the anion.

The present systems, methods and compositions, along with the attributes and attendant advantages thereof, will best be appreciated and understood in view of the following detailed description taken in conjunction with the accompanying drawings.

BRIEF DESCRIPTION OF THE DRAWINGS

FIG. 58 illustrates molecular crystal structure of host-guest $[MeSO_3@6]^-$, wherein thermal ellipsoids set at 50% probability level, and wherein R groups and H atoms (except those in the binding cavity) have been omitted for clarity.

DETAILED DESCRIPTION

Figure 1A:
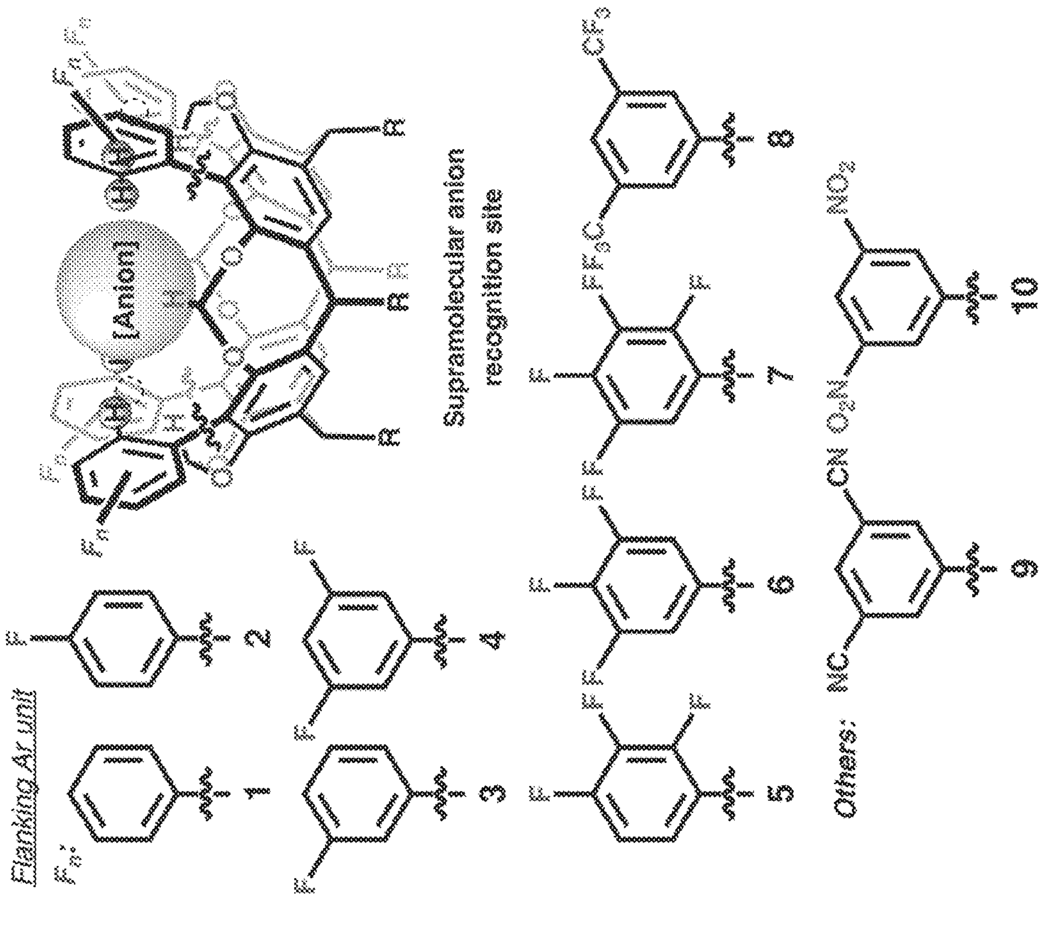
FIG. 1A illustrates a number of representative and buildup of electropositive charge at the anion recognition site by monotonic increase of the number of fluorine atoms in the aromatic flanking unit (AFU), or through other electron withdrawal group (EWG).
Figure 1B:
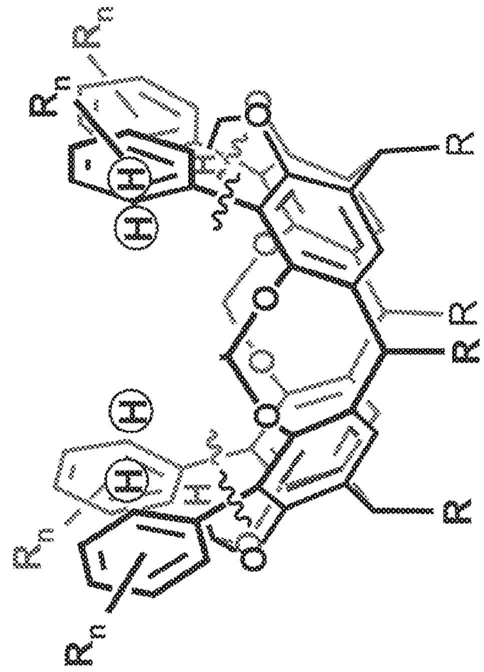
FIG. 1B illustrates an embodiment of a composition hereof.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etcetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "an electron withdrawing group" includes a plurality of such electron withdrawing groups and equivalents thereof known to those skilled in the art, and so forth, and reference to "the electron withdrawing groups" is a reference to one or more such electron withdrawing groups and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

The terms "alkyl", "aryl" and/or other groups refer generally to both unsubstituted and substituted groups unless specified to the contrary. Unless otherwise specified, alkyl groups are hydrocarbon groups and are preferably C2 to C20 (that is, having 2 to 20 carbon atoms) alkyl groups, saturated and unsaturated (that is containing double bonds or not), and can be branched or unbranched, acyclic or cyclic. The above definition of an alkyl group and other definitions apply also when the group is a substituent on another group (for example, an alkyl group as a substituent of an alkylamino group or a dialkylamino group). The term "aryl" refers to phenyl or naphthyl, which may contain electron donating and withdrawing functional groups like carboxylic acid, esters, ethers, amines, where these functional groups may be substituted with alkyl groups as defined above. As used herein, the terms "halogen" or "halo" refer to fluoro, chloro, bromo and iodo. Heteroaryl groups, heteroarene groups, or heterocyclic aromatic groups may contain one or more heteroatoms such as N, O, S and P.

"Olefinic" groups or "alkenyl" groups refer to hydrocarbons that contains one or more pairs of carbon atoms linked by a double bond (—C═C—). Olefinic groups are preferably C2 to C12. Acetylenic group include an ethynyl fragment HC≡C— (examples include, —CCH or $—CCSiMe_3$) and may, for example, be C2 to C12.

The term "amine" refers to the group $—NR^aR^b$, wherein $R^a$ and $R^b$ are for example, independently hydrogen, an acyl group, an alkyl group, and an aryl group. The term "amide" refers to the group $—C(O)R^aR^b$. The term "urea" refers to the group $—NR^aC(O)NR^aR^b$. The term "thiourea" refers to the group $—NR^aC(S)NR^aR^b$. The term "alcohol" refers to the group $—R^c$, wherein $R^c$ is, for example, an alkyl group, aryl group, and a polyether which contains a free hydroxyl (OH) at the terminal or internal position of the overall fragment. Preferably, alcohols have the formula $—(CH_2)_nOH$, wherein n in an integer in the range of 3 to 16. The term "ether" refers to $—R^dOR^e$ wherein $R^d$ and $R^e$ are, for example, independently alkyl and aryl as defined above. The term "alkyl epoxide" refer to a cyclic ether —$R^f$—O—$R^g$ with a three atom ring, wherein $R^f$ and $R^g$ are independently alkyl groups as defined herein. The term "aldehyde" refers to the group —Rh(O)H wherein Rh is an alkyl group or an aryl group as defined herein. The term "imine group" refer to —($R^aR^bC$═$NR^i$) wherein $R^a$, $R^b$ and $R^i$ are independently hydrogen, an acyl group, an alkyl group, or an aryl group as defined herein. The term "acyl group" refers to —C(O)$R^j$ wherein $R^j$ is an alkyl group, an alkoxy group, an amino group or a hydroxy group as defined herein. The term "alkoxy group" refers to —$OR^k$, wherein $R^k$ is an alkyl group as defined herein. The term "boronate ester as used herein refers to the group:

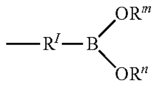

wherein $R^l$ is an alkylene group (a divalent alkyl group as such alkyl groups are defined herein), or a divalent aryl group as defined herein, and wherein $R^m$ and $R^n$ are independently alkyl groups, linear or branched, and of C4 or less, or together form a cyclic chain of three members. The term "Bpin" refers to a pinacol boronic ester group.

Hydrophilic oligomers or hydrophilic polymers may, for example, be selected from the group consisting of hyaluronic acid, glucan, chitosan, a polyalkylene oxide, a polyvinylalcohol, a polyacrylic acid, a polyacrylamide, a polyoxazoline, a polysaccharide and a polypeptide. In a number of embodiments, the at least one hydrophilic polymer is a polyalkylene oxide. The polyalkylene oxide may, for example, be a polyethylene glycol. A polyethylene glycol or other hydrophilic polymer hereof may, for example, have a molecular weight in the range of 200 to 2000 Da in a number of embodiments.

The groups set forth above, can be substituted with a wide variety of substituents. For example, alkyl and other groups may be substituted with a group or groups including, but not limited to, a benzyl group, a phenyl group, a hydroxy group, an amino group (including, for example, free amino groups, alkylamino, dialkylamino groups and arylamino groups), and halo groups.

As used herein, the term "polymer" refers to a chemical compound that is made of a plurality of small molecules or monomers that are arranged in a repeating structure to form a larger molecule. Thus, a polymer is a compound having multiple repeat units (or monomer units) and includes the term "oligomer," which is a polymer that has only a few repeat units. The term "copolymer" refers to a polymer including two or more dissimilar repeat units (including terpolymers—including three dissimilar repeat units—etc.). Polymers may occur naturally or be formed synthetically. The use of the term "polymer" encompasses homopolymers as well as copolymers. The term "copolymer" is used herein to include any polymer having two or more different monomers. Copolymers may, for example, include alternating copolymers, periodic copolymers, statistical copolymers, random copolymers, block copolymers, graft copolymers etc. Examples of polymers include, for example, polyalkylene oxides such as polyethylene glycol.

A cornerstone of the challenge in PFAS removal from aqueous systems is that an optimal separation method to remove PFAS from water has yet to be developed. To address those challenges, bottom-up supramolecular systems hereof have been developed which are capable of binding nonspherical anions either in a catalytic fashion or as robust hosts for strong binding of toxic and carcinogenic chemicals (for example, PFAS). There is a large variability in PFAS composition (fluorinated backbone), however their recognition and sequestration can, for example, be designed around one or both of their two nonspherical anionic heads, —$SO_3^-$ or —$COO^-$.

Resorcin[n]arene derivatives, a subgroup of the larger family of cavitands, have been extensively explored since the beginning of the 80's. Generally, such compounds can be synthesized in large one-pot reactions (>100 g) from cheap and/or readily starting materials. Resorcin[4]arenes are, for example, well-known to serve as hosts for a range of neutral guests. However their properties towards anion binding is scarce and for the most part rare. Nonetheless, using those representative macrocycles, hosts hereof have been designed with C—H bonds ($C_{Ar}$—H, as illustrated in FIG. 1A) pointing or directed towards the internal cavity of the macrocyclic compound with significant partial positive charge. Without limitation to any mechanism, it is hypothesized that by installing electron withdrawing groups (EWGs) on the AFUs sufficiently high electro-positive hydrogen atoms would be produced in $C_{Ar}$—H capable of binding anionic species with high affinity.

In general, macrocyclic hosts hereof may be selected based on a number of design criteria including: 1) rigidity, to minimize entropic penalties arising from conformational flexibility upon guest binding; 2) synthetically modular, to establish the host's overall connectivity through standard or generally well-known protocols; 3) amenable to fine tuning of the host's anion binding affinities; and 4) adjustable solubility, for example through the R group on the macrocycle (for example, resorcin[n]arene) backbone. The R group does not interfere with the anion recognition site.

With such design principles in mind, representative supramolecular hosts as illustrated in FIG. 1A were studied. Within the anion recognition site, the flanking units are the only fragments able to move, although with a limited rotational degree of freedom (see criteria 1 above), the connection between flanking unit and resorcin[n]arene follows a standard cross coupling reaction (see criteria 2 above), the flanking unit's EWG properties can be readily tuned (see criteria 3 above), and the R group can be tailored to, for example, hydrophobic or hydrophilic environments (see criteria 4 above).

Compounds 1-10 of FIG. 1A were contemplated as viable hosts for nonspherical anions. All of compound 1-10 were submitted for density-function theory or DFT calculations (ωB97XD/Def2SVP level of theory) using Gaussian 16, which is a recent version of software providing a wide range of modeling capabilities available from Gaussian, Inc. of Wallingford, Connecticut. To decrease the computational costs, R groups in all compounds were considered to be methyl groups. Hirshfeld charges (HCs), recommended as they yield chemically meaningful charges, were calculated for compounds 1-10. The average HC in the hydrogen atoms part of $C_{Ar}$—H bond, or $C_{CH2}$—H (shown in dashed circles in FIG. 2), are plotted in FIG. 1C. Considering the $F_n$ series of compound (compounds 1-8), the electropositive charge in the H atoms in $C_{Ar}$—H increases as more fluorine atoms are added to the aromatic flanking unit, effectively increasing the group's electron poorness, except in 8. In other words, the amount of partial positive charge within the internal cavity of the supramolecular host can be fine-tuned. Importantly, in the 3,5-substituted rings, between 4 and 8, the HC is marginally the same, however 9 and 10 are significantly larger, and similar to 7. The H atoms in $C_{CH2}$—H (illustrated within broken circles) pointing into the cavity are expected to remain around the same HC value since these are negligible affected by the EWG in the AFUs.

Correlating these computational results with anion binding affinity assays may be used to establish a structure-function relationship and extend the present approach to other hosts with potentially higher electropositive inner cavities capable of stabilizing highly reactive anionic species. Thus, in synergy with experimental results, DFT studies may be used to extend the approach hereof to other AFUs and non-aromatic units possessing directional E-H bonds, where E=C, N, or O, pointing into the cavity that can serve to host unstable anions. Non-aromatic groups including directional E-H bonds that can be used herein include amine groups, amide groups, urea groups, and thiourea groups.

The DFT-guided design approach optimizes the feedback loop between proposed and functional structure. Without limitation to any mechanism, it is hypothesized that a positive correlation (that is, wherein as the HC increases in the hydrogen atom donors, the affinity for an anionic species ($K_a$) also increases). Titration experiments may be used to extract anion binding affinities.

Figure 2:
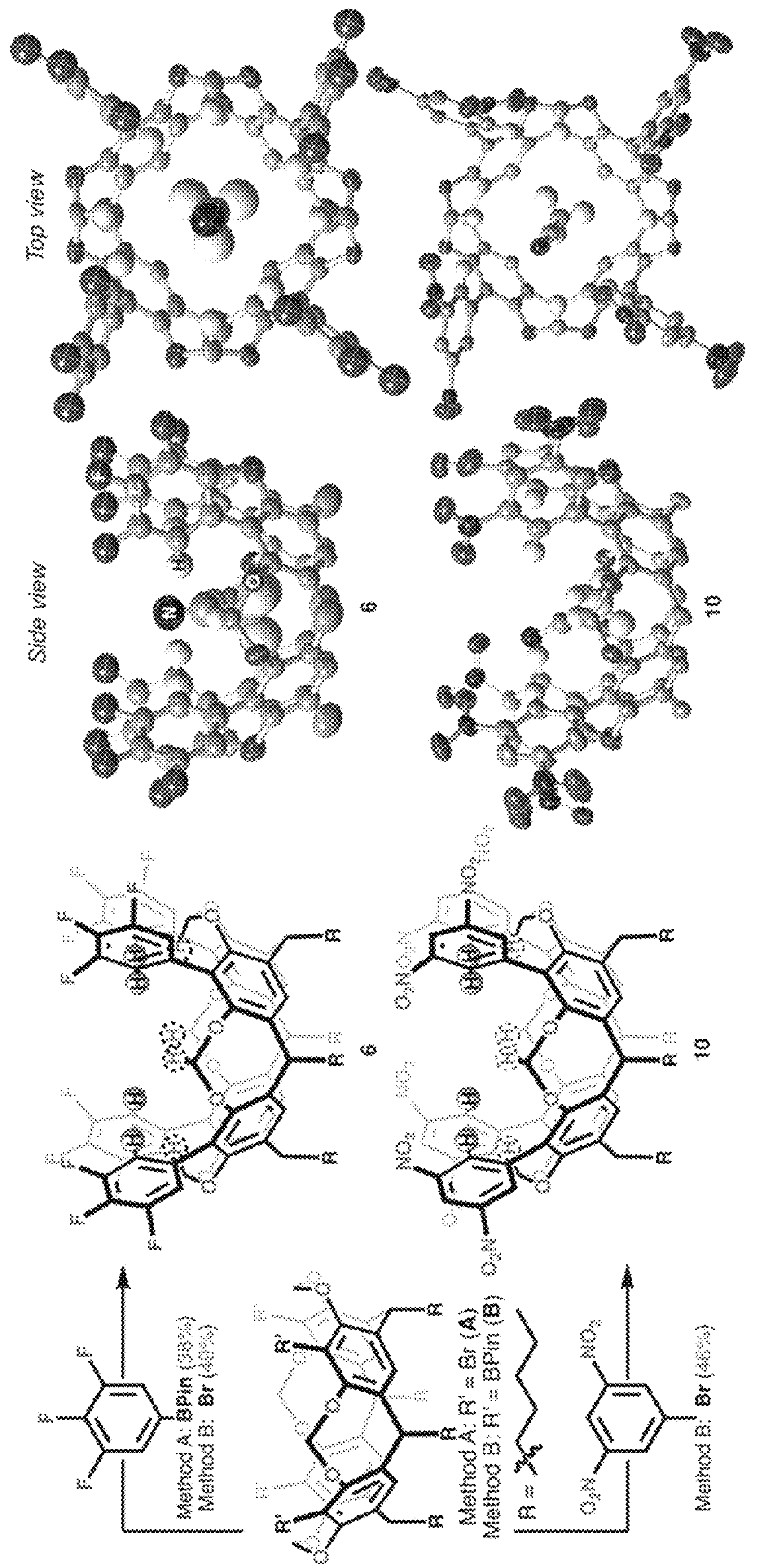
FIG. 2 illustrates a representative embodiment of synthetic scheme for supramolecular hosts 6 and 10, molecular crystal structures of compounds 6 and 10, wherein the n-pentyl chains and H atoms have been removed for clarity, except those within the inner cavity.

Syntheses and characterization of hosts 1-8 are, for example, discussed in further detail in the Experimental Examples section hereof. Results indicate the adopted design criteria set forth above to be successful. Synthesis of 6 follows a Suzuki-Miyaura cross coupling reaction between (method A) A and 3,4,5-trifluorophenyl boronic acid pinacol ester, or from (method B) B and 1-bromo-3,4,5-trifluorobenzene. See, for example, J. A. Bryant; M. T. Blanda; M. Vincenti; D. J. Cram. Guest Capture during Shell Closure. *J. Am. Chem. Soc.* 1991, 113, 2167 and C. B. Aakeröy; P. D. Chopade; N. Schultheiss; J. Desper. Versatile Launch Pad for Facile Functionalization of Cavitands. *Eur. J. Org. Chem.* 2011, 2011, 6789, the disclosures of which are incorporated herein by reference. The synthesis of macrocyclic compounds is also discussed in U.S. Patent Application No. 17,386,100, the disclosure of which is incorporated herein by reference. The synthesis of compound 10 proceeded only at relevant yields through a cross coupling reaction using B and 1-bromo-3,5-dinitrobenzene. The synthetic versatility allows syntheses for a wide range of aromatic flanking units. Single-crystal X-ray diffraction structures of 6 and 10 are shown in FIG. 2. Both structures display a molecule of MeCN trapped within its cavity, an early indication of its hosting properties.

Figure 3:
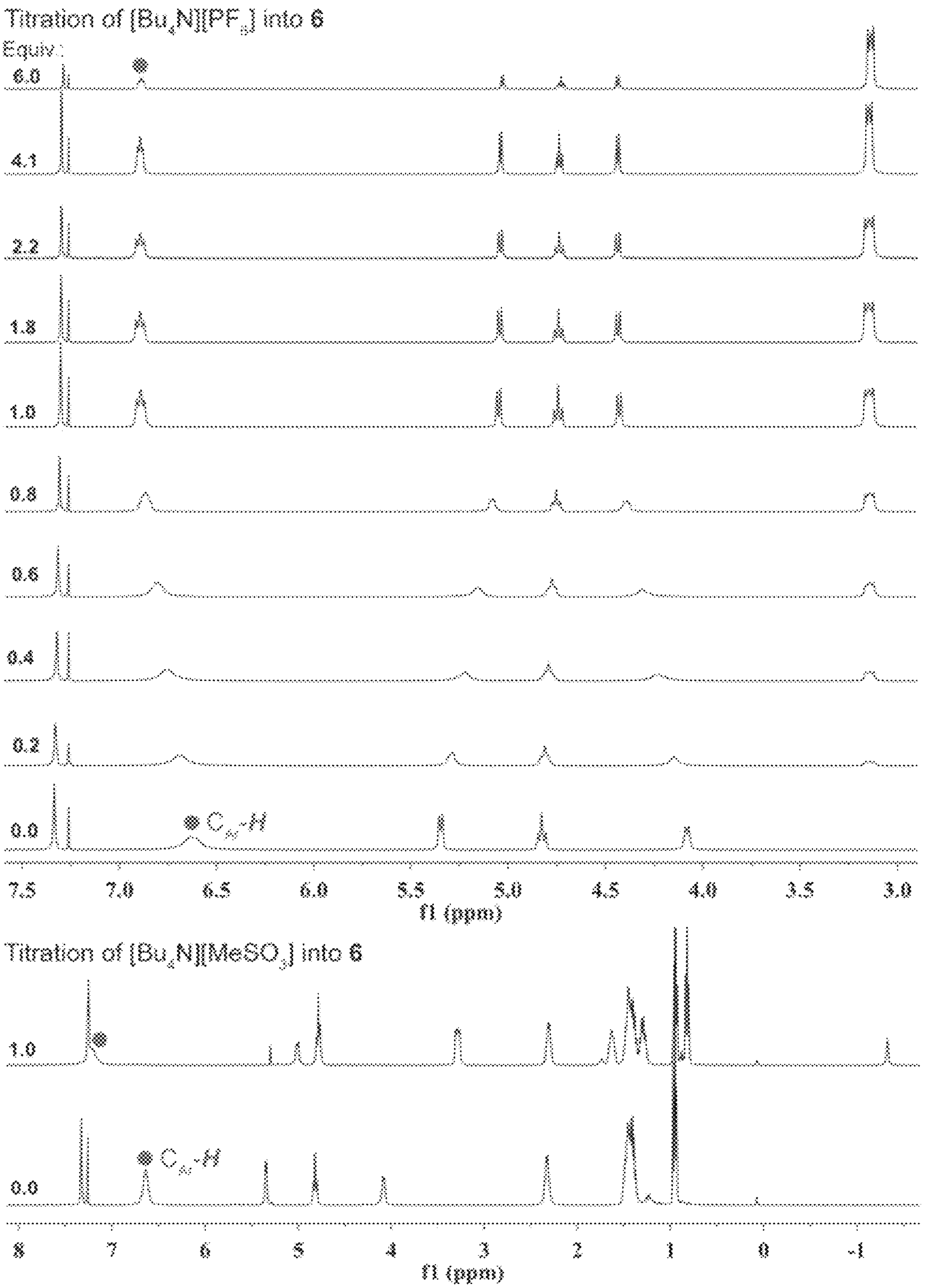
FIG. 3 illustrates titration of (top) $[Bu_4N][PF_6]$ and (bottom) $[Bu_4N][MeSO_3]$ into a solution of host/compound 6 in $CDCl_3$.
Figure 4:
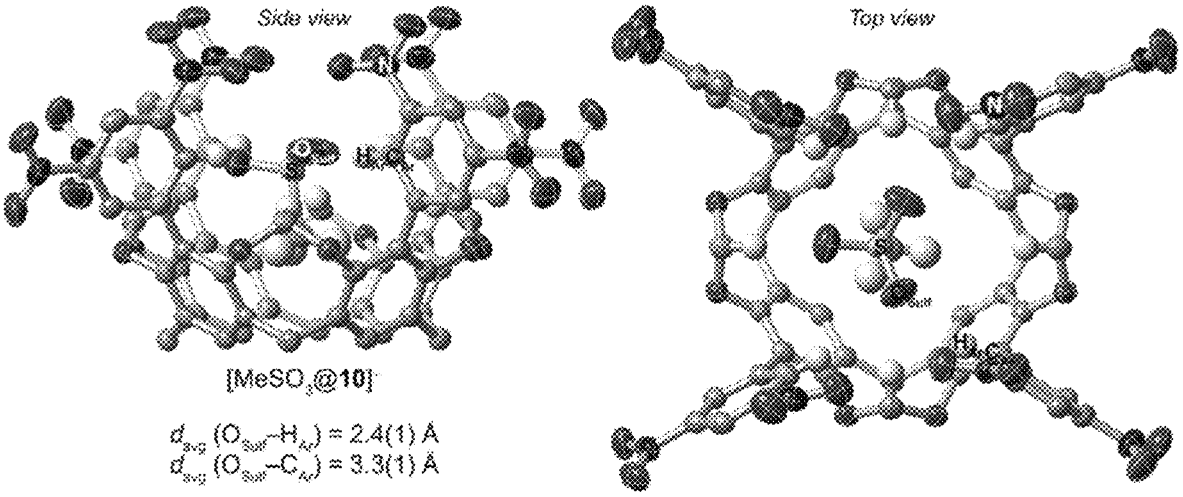
FIG. 4 illustrates a molecular crystal structure of host-guest adduct $[MeSO_3@10]^-$, wherein thermal ellipsoids are set at 50% probability level, and $[Bu_4N]^+$, R groups (n-pentyl), and H atoms, except those directed towards the internal cavity, have been removed for clarity.

Titration experiments demonstrate a remarkable affinity and selectivity by the hosts hereof towards large anions. As used herein, the term "large anion" refers to any anion larger than iodide. When 6 is titrated with $[Bu_4N][PF_6]$, a gradual shift of $^1H$ resonances is observed (see $C_{Ar}$—H in the top of FIG. 3) between 0 and 1 equivalent, akin to weak-to-medium binding affinity, fitting to a $K_a$ of $1.510(3)\times10^4\ M^{-1}$ in $CDCl_3$ (dielectric constant, ε, of $CHCl_3$=4.8). In contrast, when $[Bu_4N][MeSO_3]$ is titrated in $CDCl_3$ there is no gradual shift, there is an instantaneous formation of $[Bu_4N][MeSO_3@6]$ and free 6 (see FIG. 3 bottom). The differences in the $^1H$ NMR (4-5.5 ppm) of 6 at 1 equivalent of $[PF_6]^-$ vs $[MeSO_3]^-$ are notable. In fact, this strong binding behavior for $[MeSO_3]^-$ is identical when titrated into 6 in the more polar DMSO-$d_6$ (ε=46.8). Hence, $K_a$s between $[PF_6]^-$ and $[MeSO_3]^-$ differ by multiple orders of magnitude when hosted by 6. Looking back at the DFT data, 10 with the highest HC in the $C_{Ar}$—H atoms is expected to provide the highest partial electropositive charge towards the host's inner cavity and thus result in the largest $K_a$ for a given anion. This was corroborated when the host-guest adduct $[MeSO_3@10]$ remained intact even after in situ monitoring it at 100° C. in DMSO-$d_6$. This adduct was crystallized and its molecular structure is shown in FIG. 4. Strikingly, the average distance of this hydrogen bond, $d_{avg}$ ($O_{sulf}$—$H_{Ar}$), is among the shortest ever reported.

The experimental binding affinity data shown here, and that from other hosts in FIG. 1A, correlates well with the HCs obtained from DFT. Such studies may be used to validate this HCs-$K_a$s relationship, which may be used to predict anion binding properties of novel hypothetical hosts hereof. Ultimately, the host(s) with the highest HCs will be better suited to stabilize highly reactive anions. Studies as described herein may be used to determine the capabilities of hosts hereof by establishing the HCs-$K_a$s relationship.

As described above, in a number of embodiments hereof, modular systems based on a resorcin[4]arene scaffold are readily tuned to create directional and highly electropositive C-Ii hydrogen bonds in a well-defined geometry. Compound 6 (FIG. 5A) is synthesized readily from a tetrabromo-resorcin[4]arene species and (3,4,5-trifluroropheny)boronic acid pinacol ester in a four-fold cross-coupling reaction. For simplicity, the 3,4,5-trifluroropheny moiety in compound 6 is referenced as the aromatic flanking unit. A large chemical space exists for the R group. As described above, a range of hosts with different fluorinated AFUs was synthesized and tested for nonspherical anion binding properties (as, for example, described in the Experimental Examples). Once again, it was found that compound 6 and other analogues bind sulfonates with $K>>10^6\ M^{-1}$ in DMSO-$d_6$ (FIG. 5B).

The data obtained with compounds such as 6 and analogous species led to studies to determine if the hosts hereof may serve to sequester PFAS. In further investigations, filtering membranes were fabricated from compound 6 and PFAS sorption was tested under environmentally relevant concentrations (1 μg/L or 1 ppb). In forming a filtering membrane or other filter media, a plurality of macrocyclic moieties hereof may immobilized upon a surface or covalently incorporated within a polymer. Such a polymer may be an existing polymer or macrocyclic precursor compounds of macrocyclic moieties hereof may be polymerized. Polymerization of any host alone is typically not sufficient since the resulting polymer must have sufficient water permeability to allow PFAS to internally diffuse. Preliminary data indicates that 6', containing a terminal epoxide in the R group, can be polymerized with ROH producing polyfluorocage membranes (PFMs, FIG. 5C). PFMs have shown in batch experiments to reduce the concentration of perfluorooctanoic acid (PFOA)—one of the most toxic and widespread species of the PFAS family—in aqueous samples from environmentally relevant concentrations to concentrations well below the threshold advised by the EPA in drinking water (70 ppt, FIG. 5D). Although much synthetic and operational optimization is required, these results validate the bottom up approach hereof and further point to applications extrapolating this strategy to other toxic chemicals in water.

Figures 5A, 5B, 5C, 5D:
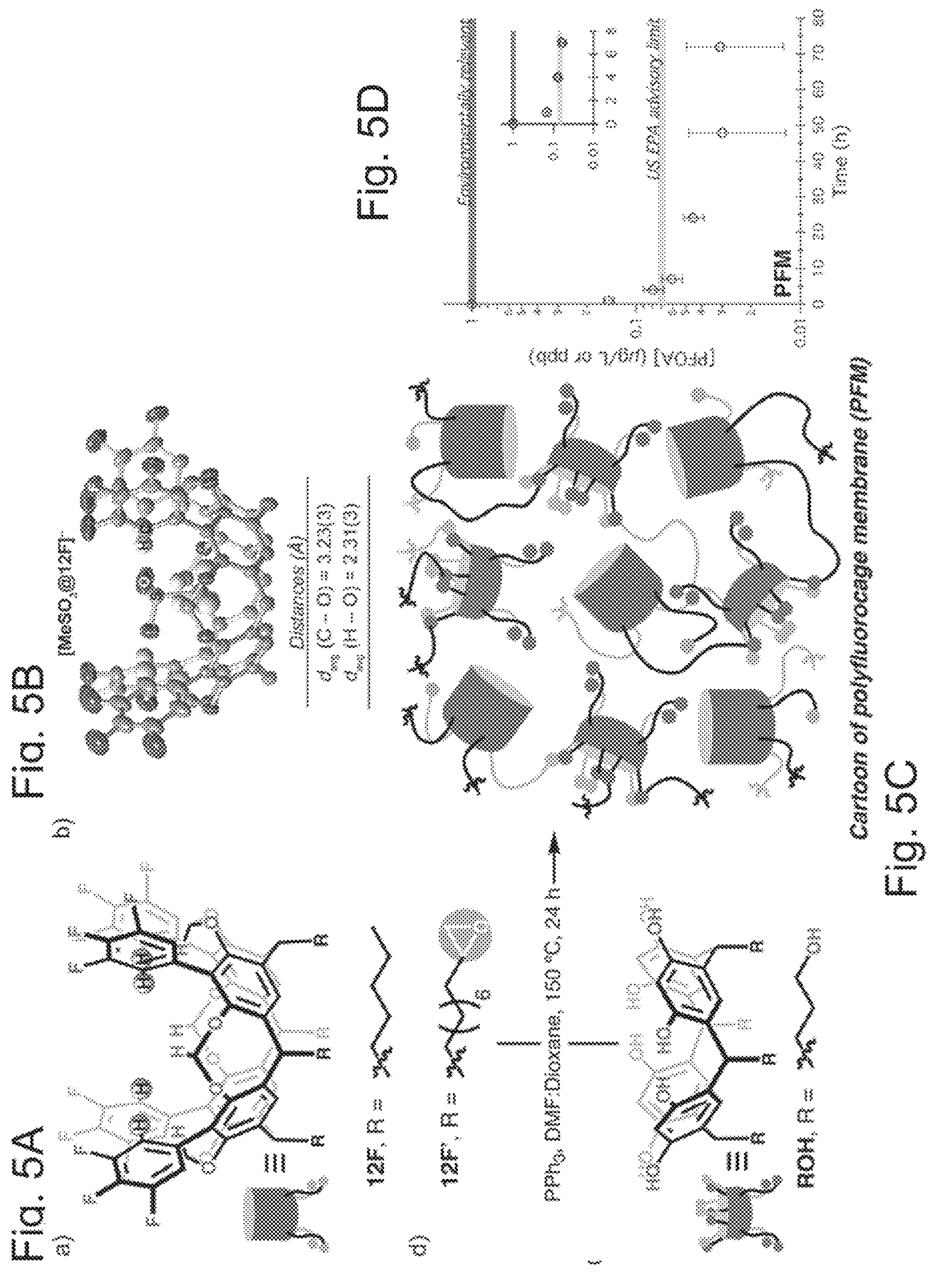
FIG. 5A illustrates nonspherical anion hosts hereof wherein, in anion host 6, R=n-pentyl, and in ion host 6', R=—$CH_2(CH_2)_7CHOCH_2$).
FIG. 5C illustrates a representative embodiment of a synthetic scheme for a polymeric species/polyfluorocage membrane PFM.
FIG. 5D illustrates residual PFOA concentration in aqueous samples treated with the PFM of FIG. 5C under the following conditions: 100 mL total aqueous sample volume, [PFOA]=1 μg/L, and 1 mg of suspended PFM followed over 72 hours.
Figure 5E:
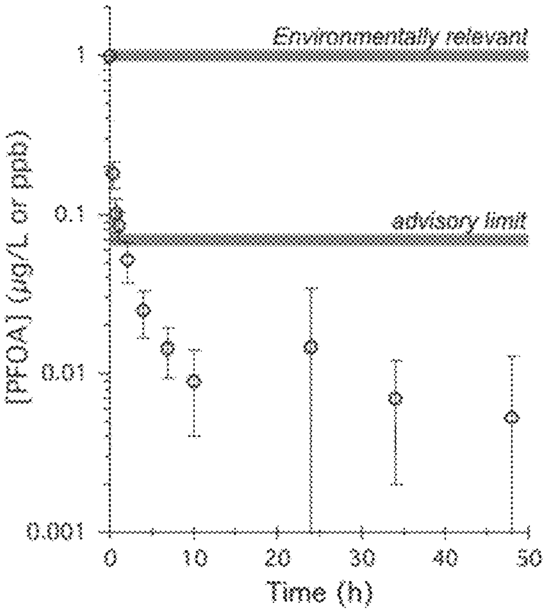
FIG. 5E illustrates another study of residual PFOA concentration in aqueous samples treated with another PFM synthesized similarly to the PFM illustrated in FIG. 5C.
Figure 5F:
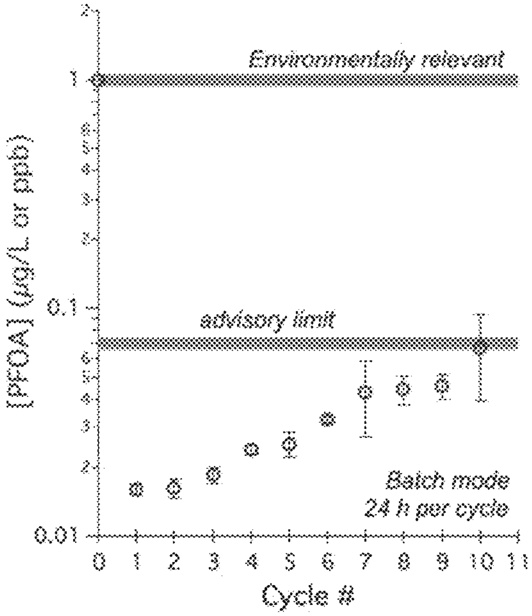
FIG. 5F illustrates cycled use of the PFM of FIG. 5E demonstrating effective removal of PFOA for at least ten cycles.
Figure 5G:
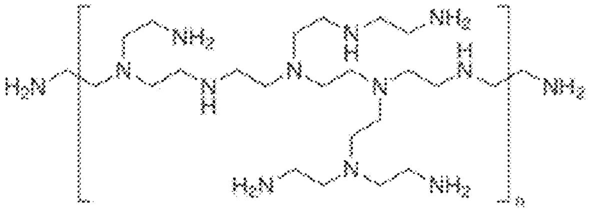
FIG. 5G illustrates residual concentrations in removal studies of PFAS of varying size using the PFM of FIG. 5E.
Figure 5G:
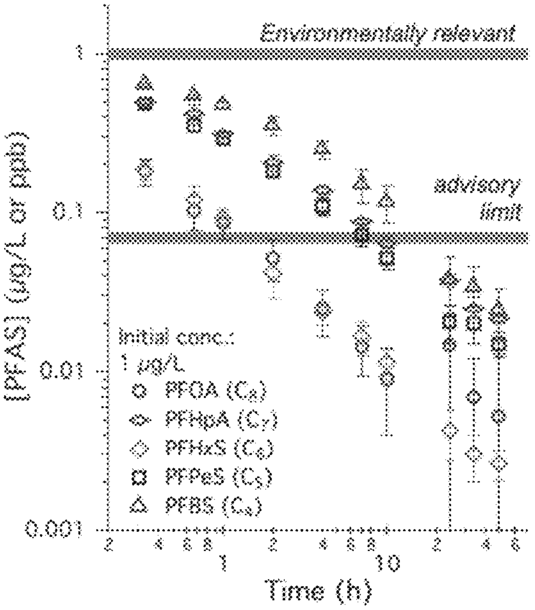

FIG. 5E illustrates another study of residual PFOA concentration in aqueous samples treated with another PFM synthesized similar to that illustrated in FIG. 5C wherein the polymerization reaction took place at 120° C. In the studies of FIG. 5F, the PFM of FIG. 5E was cycled through multiple additions of PFOA bringing its concentration back to 1 μg/L after each cycle and subsequently allowed to remove PFOA for a period of 24 hours per each cycle. The end goal of studies in FIG. 5F is to test reusability of the PFM. The results for the PFM of FIG. 5F demonstrated effective removal of PFOA to a concentration below the advisory level for at least ten cycles. FIG. 5G illustrates residual concentrations of the PFM of FIG. 5E in removal studies of various PFAS of different size (carbon number $C_4$-$C_8$). As illustrated in FIG. 5G, the smaller PFAS are more difficult to remove, requiring longer uptake, removal, or soaking times to decrease the residual concentration below the advisory limit of 70 ppt or 0.07 ppb.

Figure 5H:
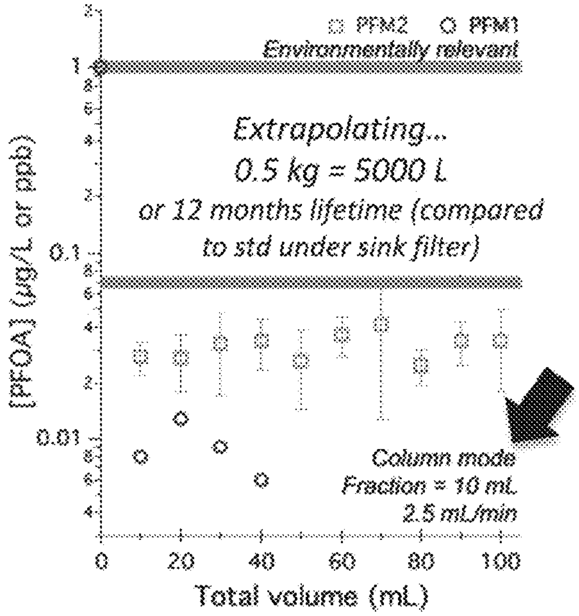
FIG. 5H illustrates the result of studies of two PFMs (PFM1 and PFM2) in a column mode to remove PFOA wherein a 12-month useful lifetime (for example, in use in an under-sink filter system) was determined.

FIG. 5H illustrates the result of studies of two PFMs (PFM1 and PFM2) in a column mode with a fractional volume of 10 mL for 2.5 mL/min flow to simulate under-sink filtration of drinking water for removal PFOA. A 12-month useful lifetime for use in an under-sink filter system was determined. PFM1 was that of FIG. 5E. In the case of PFM2, a different comonomer was used, in the polymerization of the membrane. In the studied embodiment, the comonomer for the polymerization of PFM2 was a polyethyleneimine (PEI) as, for example, illustrated at the top of FIG. 5H.

The studies of PFM2 demonstrates that commercially available oligomers/polymers can be used as comonomers with supramolecular cages hereof in forming PFM. In general, such polymeric comonomers should be compatible with water (that is, wettable or interacting with water). It is not desirable for such polymers to be soluble but to form a fine suspension in water. It is also desirable that the polymer contain functional groups that can interact with water and potentially with the anions of interest. Such functional groups can be those interacting with water through hydrogen bonding, either as acceptors or donors (for example, amine groups, carboxylic acid groups (—COOH), hydroxyl groups, etc.). Establishing a hydrogen bonding with water allows water to wet the polymer and allows diffusion of ions within the polymer. Enhanced sequestration can be achieved via interaction with, for example, a polymeric comonomer including such groups. As clear to one skilled in the chemical arts, the polymer should also be compatible with the polymerization technique used in forming the PFM (for example, a ring-opening polymerization of an epoxide as described in connection with FIG. 5C). Further, it is desirable to maintain the molecular weight (for example, number average molecular weight) of the polymer relatively low to avoid diffusion limitations. In that regard, use of polymers with relatively high molecular weight can result in larger particles into which diffusion of entities to be removed takes too long. In the case of PFM2, the polymer PEI had a number average molecular weight ($M_n$) of 600 Dalton (by GPC). Use of a PEI polymer of the structure illustrated in FIG. 5H with a number average molecular weight of 1800 Daltons provided less impressive results. A number of other polymeric comonomers were studied. For each such polymer, one skilled in the art can readily determine a suitable or an optimal molecular weight for a particular use via routine experimentation including, for example, studies as described herein.

One may, for example, fine tune the cage size of the supramolecular cages hereof for interaction with specific anion. For example, in the case that the macrocyclic end group of the supramolecular cage is a resorcin[n]arene, the value of n may be predetermined for specific anions. Moreover, even in the case of a particular value of n, the length of connective groups within the macrocyclic end group may be chosen to adjust the cage size. Still further, the length of connective group between the aromatic groups of the macrocyclic end group and the groups including the electropositive E-H bond donors hereof can be determined to achieve a particular cage size. In that regard, longer connective groups will lead to increased cage size.

Figure 6:
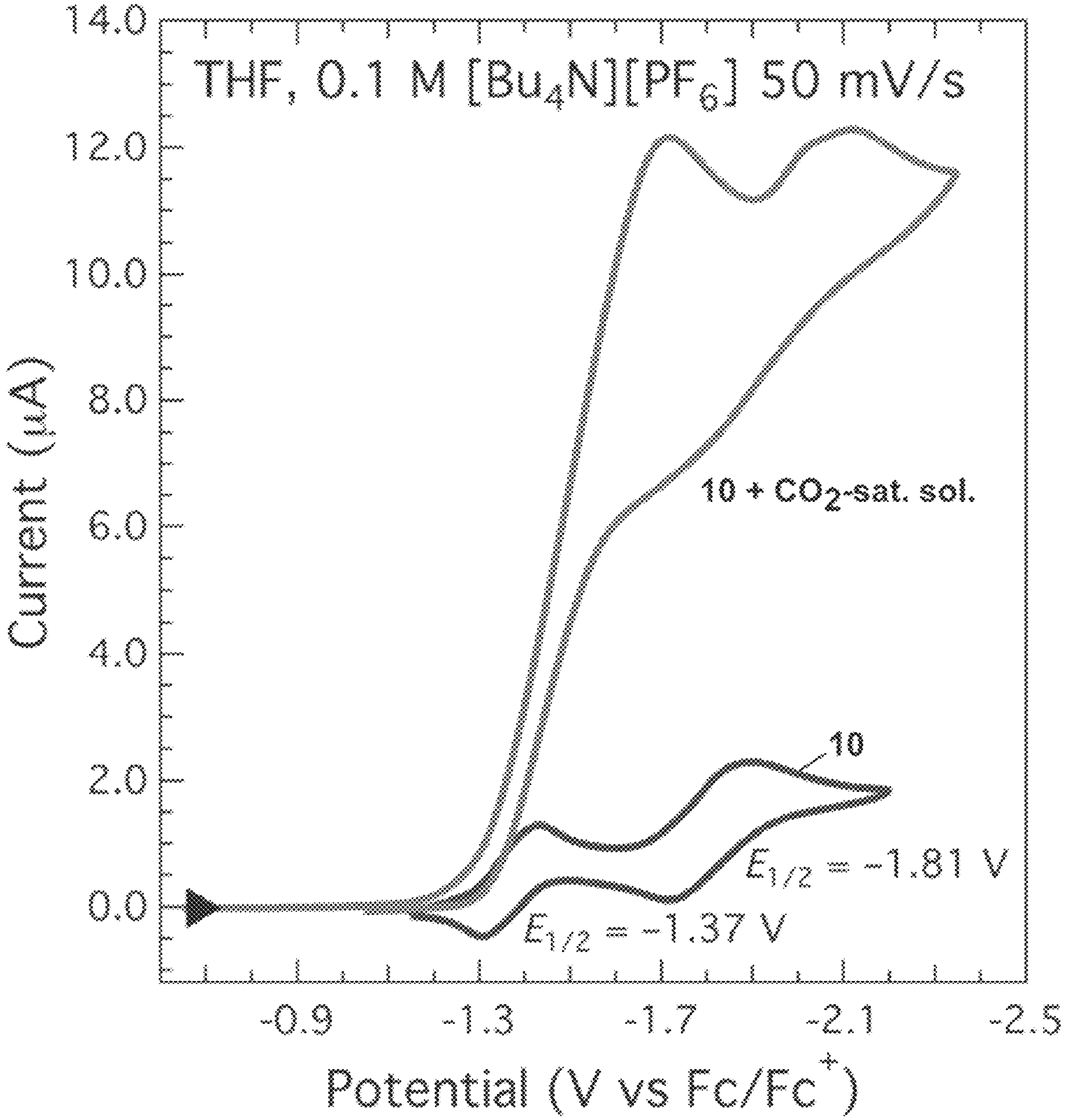
FIG. 6 illustrates electrocatalytic behavior imparted by $8NO_2$ during $CO_2$ reduction.

As described above, supramolecular sites were designed capable of binding anions through $C_{Ar}$—H bonds at different strengths without changing the overall geometry of the recognition site. Although quantitative determination of $K_a$s for different anions hosted by compound 10 remains to be calculated, data indicates that 10 is the host with the strongest affinity for anions. In an example of further used of supramolecular cages hereof, compound 10 was used in preliminary electrochemical reduction of $CO_2$. THF was selected for these experiments as it readily dissolves 10 and it has a greater than ideal solubility for $CO_2$ at 25° C. (mole fraction of dissolved $CO_2$, $x_{CO2(THF)}$=0.0270; $x_{CO2(ideal)}$=0.0229 at $P_{CO2}$=1 atm). Cyclic voltammetry (CV) data of 10 alone displays two electrochemical reductions (FIG. 6). Upon saturating the THF solution with dry $CO_2$, an upturn in current is observed around the onset of the first reduction event for 10, which is the hallmark signature when electrocatalysis is taking place (FIG. 6). Under these experimental conditions the molar ratio of dissolved $CO_2$-to-10 is at least $1\times10^3$. The above observations may indicate that compound 10 is facilitating the formation of an in situ generated anion. Further studies may be conducted to explore the nature and fate of such anionic species to optimize performance. Such studies may, for example, include the use of $^{12}C/^{13}C$-labeled $CO_2$ to determine the product(s) formed during rotating electrode electrocatalysis (GCMS, $^{13}C$ NMR, and FTIR), chemical reduction experiments, and titration experiments of $C_1$- and $C_2$-containing anions (e.g., formate, carbonate, oxalate).

Experimental Examples

Fluorocage synthesis and structure. Fluorocages or supramolecular cage hosts were conceived by trying to maximize the host-guest properties of resorcin[n]arenes towards anionic species. While their host-guest capabilities for neutral guests are well-established, their anion hosting abilities are not nearly as developed. A modular family of resorcin[4]arene-based cages, 1-10 were designed an synthesized (see FIGS. 1A and 7), all having the same binding cage geometry capable of accommodating large guests, and also able to tune the overall framework to systematically and monotonically increase the anion binding affinity.

Figure 7:
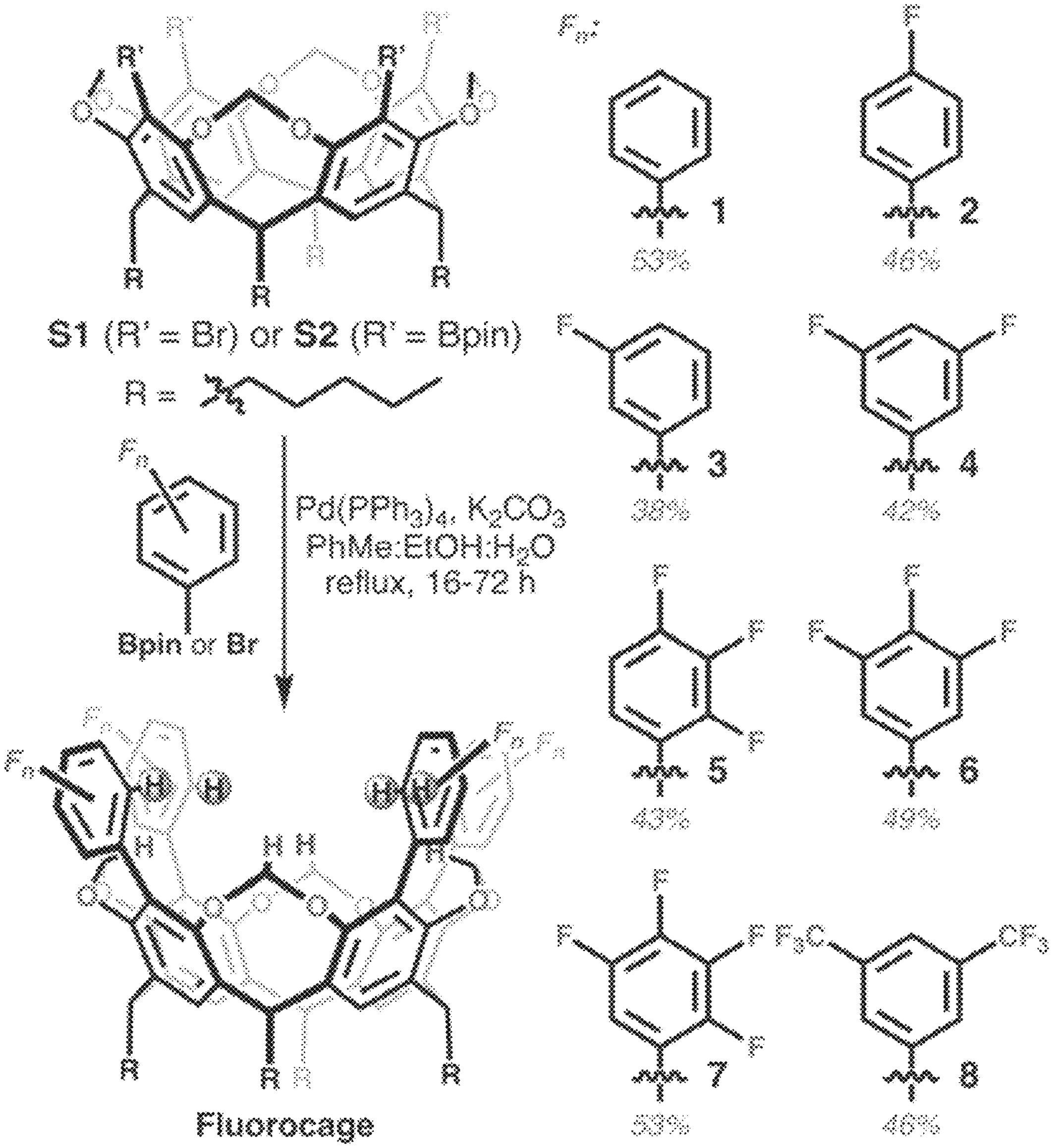
FIG. 7 illustrates a general synthetic schemes for flourocages 1-8.

As illustrated in FIG. 7, fluorocages 1-8 were synthesized from S1 or S2 through Suzuki-Miyaura cross-coupling reactions with the corresponding aromatic flanking unit, $F_n$ in yields ranging from 38 to 53%. All hosts define a cavity comprised of eight C—H donors, four aromatic colored in blue ($C_{Ar}$—H) and four aliphatic colored in purple ($C_{CH2}$—H). It was hypothesized that installing electron withdrawing groups (EWGs) on the aromatic flanking units would produce sufficiently high electropositive hydrogen atoms in $C_{Ar}$—H capable of binding anionic species with high affinity. Moreover, fluorocages 1-8 are designed as rigid scaffolds to minimize entropic penalties that may arise from conformational flexibility and host rearrangement upon guest binding.

$^1H$, $^{13}C$, and $^{19}F$ NMR spectra in $CDCl_3$ of 1-4, 6, and 8 revealed their expected ideal $C_{4v}$ molecular symmetry in solution. Fluorocages 5 and 7 displayed a more complex behavior. However, in-depth analysis of their $^1H$ NMR spectra corroborates their assignment. High quality crystals for single-crystal X-ray diffraction for 1-8 provided further confirmation of their molecular structure. Crystals of 1-8 were all obtained by slow evaporation of a $MeCN:CH_2Cl_2$ solution at room temperature. All fluorocage structures displayed one molecule of MeCN bound within their inner cavity, except 7 which displayed heavy disorder that prevented correct modeling of the MeCN molecule. The molecular structures of 3, 5, and 7 displayed rotational disorder around their aromatic flanking units. For example, fluorocage 3 displayed in the major occupancy structure three F atoms pointing into the inner cavity while one F atom is pointing away. Nonetheless, this behavior is not manifest in solution, as the NMR data indicated a fully $C_4$-symmetric structure. In contrast, 5 and 7 displayed solid state major occupancy structures with idealized $C_s$ and $C_{2v}$ point group symmetries, respectively, which is reconciled with their complex solution behavior indicating that rotation around the biaryl moiety is hampered and that all possible rotational isomers coexist in solution, even at 100° C. Up to six different rotamers are possible for 5 and 7. DFT calculations at the M06-2X/6-311++G(3df,2p)+CPCM(solvent)//M06-2X/6-31+G(d,p) level of theory, where solvent=$CHCl_3$ or DMSO, showed that these rotamers are relatively close in energy, thus supporting the experimental observations in solution.

Anion affinity towards square planar electropositive cavity. The design and engineering of the electropositive cavity within 1-8 is exemplified by the hosted MeCN molecule, which points its electronegative N atom towards the cavity's electropositive H atoms. The average C-to-N distances ($C_{Ar}$—H and $N_{MeCN}$) for all fluorocages is 4.0±0.2 Å [4.0(2) Å (number in parenthesis indicates the estimated standard deviation in the final digit)], while the average C-to-π system centroid ($C_{MeCN}$ and centroid of each aromatic ring comprising the resorcin[4]arene base) is 3.55(4) Å. Anion sequestration was first tested by $^1H$ NMR titration experiments adding [n-$Bu_4$N][$PF_6$] to 2-8 in $CDCl_3$ (solvent dielectric constant, $\varepsilon_r$=4.7) at 20° C. (Figure S38-S44). There is negligible affinity for $[PF_6]^-$ by 1-3, however 4, 6, and 8 display weak-to-medium binding peaking at 6 with $K_a$ of $1.510(1)\times10^4$ $M^{-1}$, while 4 and 8 display $K_a$ of 84(12) and 280(15) $M^{-1}$, respectively. Surprisingly, 5 displays no binding of $[PF_6]^-$, while 7 only reaches $K_a$=$1.64(11)\times10^{13}M^{-1}$, likely as a result of the energetic penalty involved in rearranging their initial conformational distribution. Only a few synthetic hosts are known to bind large anions such as $[PF_6]^-$. Overall, the adduct $[PF_6\subset 6]^-$ demonstrates that the square planar arrangement of electropositive H atoms serves to sequester large anionic species.

Figure 8:
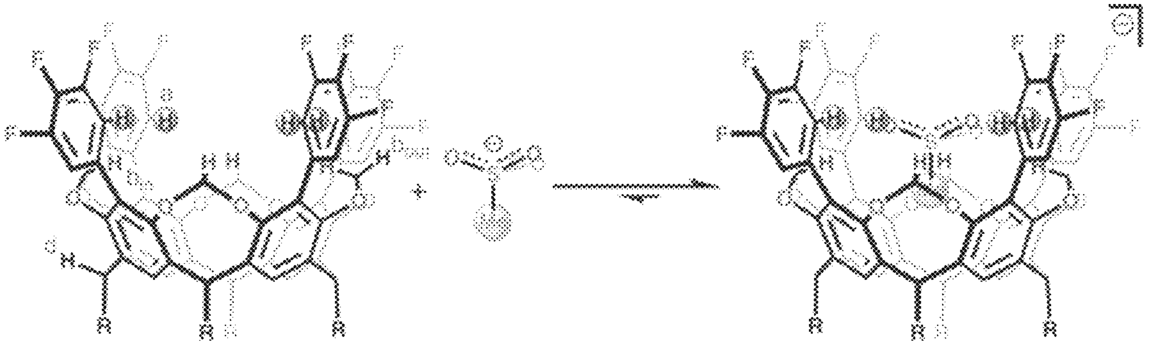
FIG. 8 illustrates equilibrium between compound/fluorocage 6 and $[MeSO_3]^-$ wherein (a) $^1H$ NMR titration of $[n\text{-}Bu_4N][MeSO_3]$ into 6 in $CDCl_3$ at 20° C. (b) $^1H$ NMR of 6 (bottom) and $[n\text{-}Bu_4N][MeSO_3 \subset 6]$ (top) in DMSO-$d_6$ at 100° C., wherein circular symbols correspond to the encircled and non-encircled hydrogen atoms, respectively, in the scheme at the top of the figure, wherein open symbols indicate free host 6, while solid symbols correspond to the adduct $[n\text{-}Bu_4N][MeSO_3 \subset 6]$, and wherein relevant H atoms are labeled a, $b_{in}$, and $b_{out}$.
Figure 8:
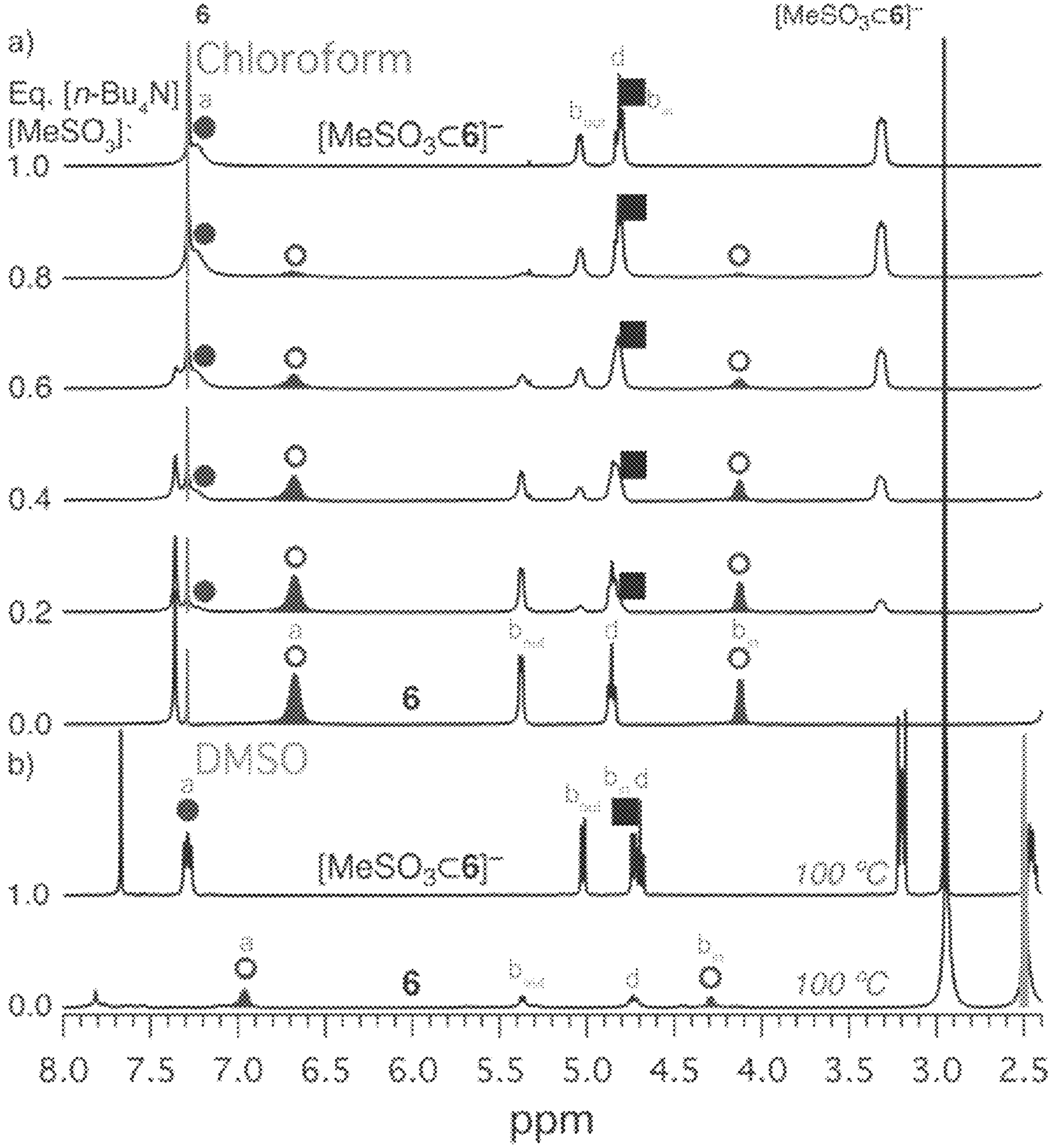

Encouraged by the binding results of $[PF_6]^-$, tests were conducted to study the ability of fluorocage 6 to bind other noncoordinating $[N_3]^-$ and $[SCN]^-$, bent $[NO_2]^-$, and trigonal planar $[NO_3]^-$ have negligible-to-weak binding affinities, likely resulting from their size mismatch with the hosting cavity. Annion associates constants are set for in Tables 1 and 2 However, strong binding is observed as the anion's size reaches a radius of ~2.2 Å judging from the series $[BF_4]^-$ (r=2.05(19) Å), $[HSO_4]^-$ (r=2.21(19) Å, $[IO_4]^-$ (r=2.25(19) Å, $[ReO_4]^-$ (r=2.27(19) Å), $[IO_4]^-$ (r=2.31(19) Å), and $[SbF_6]^-$ (r=2.52(19) Å). Other nonspherical anions, as acetate, $[MeCO_2]^-$, also binds to 6 ($K_a$=$4.8(3)\times10^3$ $M^{-1}$), however the closely related $[MeSO_3]^-$ binds so strongly to 6 in $CDCl_3$ that its affinity falls beyond the reliable measurable limit via $^1H$ NMR ($10^6$ $M^{-1}$), see panel a of FIG. 8. Note that p-toluenesulfonate, $[pTsO]^-$, with its much larger organic group, also binds to 6 displaying a $K_a$ of $1.88(4)\times10^3M^{-1}$, where its p-toluene fragment points away from the fluorocage's cavity.

TABLE 1

Anion association constants ($K_a$, $M^{-1}$) of $[PF_6]^-$ and [$MeSO_3$] to fluorocages 1-8.

| Salt | Solvent | 1 | 2 | 3 | 4 | 5 | 6 | 7 | 8 |
|---|---|---|---|---|---|---|---|---|---|
| [n-$Bu_4$N] [$PF_6$] | $CDCl_3$ | 0 | 0 | 0 | 84(12) | 0 | $1.510(1)\times10^4$ | $1.64(11)\times10^3$ | 280(15) |
| [n-$Bu_4$N] [$MeSO_3$] | DMSO-$d_6$ | ND [a] | ND [a] | ND [a] | $>10^6$ [b] | $>10^6$ [b] | $>10^6$ [b] | $>10^6$ [b] | NC[c] |

[a] ND = Not determined.
[b] Strong binding that prevents direct titration via $^1H$ NMR, even at 100° C. the anion remains bound. $10^6M^{-1}$ is taken as the maximum reliable limit for NMR titration experiments.
[c] Not soluble in DMSO-$d_6$ even at 100° C.

TABLE 2

Anion association constants ($K_a$, $M^{-1}$) of [n-$Bu_4$N][anion] to fluorocage 6. Thermochemical radii (r) in parenthesis.

| Host | Solvent | $I^-/Br^-$ | $[N_3]^-/[SCN]^-$ | $[NO_2]^-/[NO_3]^-$ | $[BF_4]^-$ (2.05) | $[HSO_4]^-$ (2.21) |
|---|---|---|---|---|---|---|
| 6 | $CDCl_3$ | 161(19)/0 | 8(6)/290(8) | 40(40)/76(6) | 990(23) | $7(3)\times10^4$ |
| Host | $[ClO_4]^-$ (2.25)/ $[ReO_4]^-$ (2.27) | $[IO_4]^-$ (2.31) | $[PF_6]^-$ (2.42)/ $[SbF_6]^-$ (2.52) | $[MeCO_2]^-$/ $[MeSO_3]^-$ | $[pTsO]^-$ [a] | |
| 6 | $7.91(9)\times10^3$/ $1.08(2)\times10^3$ | $1.00(3)\times10^3$ | $1.510(1)\times10^4$/ 230(20) | $4.8(3)\times10^3$/$>10^6$ | $1.88(4)\times10^3$ | |

[a] pTs = p-toluenesulfonyl.

Sulfonate anion appears to have the optimum size to fit in the cavity described by the four electropositive H atoms in $C_{Ar}$—H. As a result of this observation, the binding properties of $[MeSO_3]^-$ towards 1-5 and 7-8 in $CDCl_3$ at 20° C. were investigated. Host 1 failed to bind $[MeSO_3]^{-1}$. Fluorocages 2 and 3 displayed binding of $[MeSO_3]^-$ with $K_a$ of 22(4) and 667(38) $M^{-1}$, respectively, while host 8 exhibited slow exchange in the NMR time scale with $K_a$≈$2.5(2)\times10^3$ $M^{-1}$. In contrast, fluorocages 4 and 7, similar to 6, revealed binding affinities well-above $10^6$ $M^{-1}$. Fluorocage 5 displayed no binding of $[MeSO_3]^-$ in $CDCl_3$. Surprisingly, NMR experiments in the much more polar solvent DMSO ($\varepsilon_r$=46.8) display 4-7 strongly binding $[MeSO_3]^-$, even when the solution is heated to 100° C. (in situ $^1$H NMR, FIG. 8*b*). This finding led to the conclusion that binding of $[MeSO_3]^-$ to hosts 4-7 in DMSO-$d_6$ exceeds $K_a$ of $10^6$ $M^{-1}$. Assuming the general anion binding in solution model put forward by Liu et al. holds true for $[MeSO_3]^-$, it is expected that $K_a$ for $[MeSO_3]^-$ binding to hosts 4-7 in $CDCl_3$ to surpass by several orders of magnitude $10^6$ $M^{-1}$. Y. Liu, A. Sengupta, K. Raghavachari and A. H. Flood, *Chem.,* 2017, 3, 411-427. Altogether, the qualitative picture portrayed by the NMR data reveals that the equilibrium between host+$[MeSO_3]^-$ and $[MeSO_3 \subset host]^-$, for hosts 4-7, is strongly displaced towards the host-guest adduct.

Figure 9B:
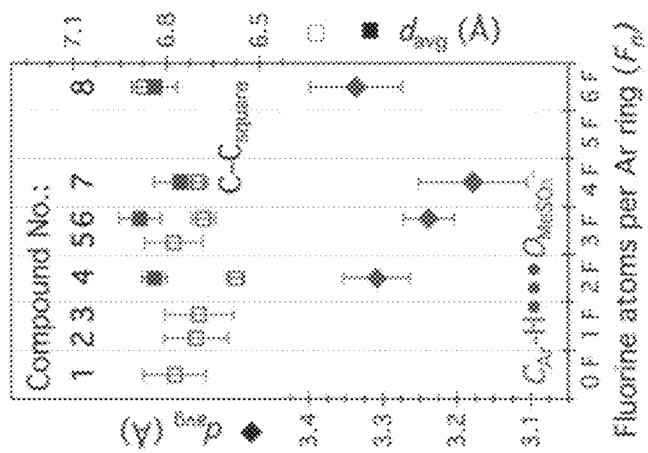
FIG. 9B illustrates comparison of structural molecular metrics, wherein average $C—C_{square}$ represented by squares and C•••O distances are represented by diamonds, and wherein pen symbols correspond to (compound nos.) 1-8, and filled symbols to $[MeSO_3 \subset host]^-$, for host=4, and 6-8.
Figure 9A:
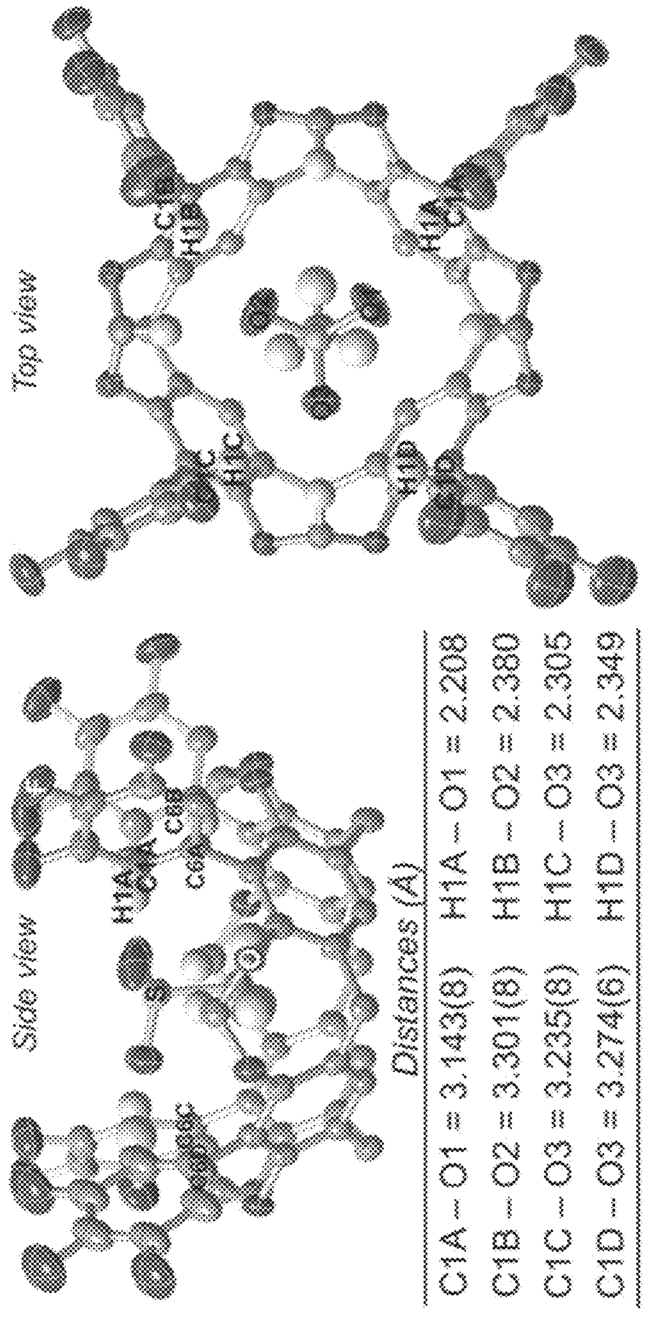
FIG. 9A illustrates side and top view of the molecular crystal structure of $[MeSO_3 \subset 6]^-$ obtained at 220 K, wherein thermal ellipsoids are set at 50% probability level, and wherein the $[n\text{-}Bu_4N]^+$, R groups (n-pentyl), and H atoms are omitted for clarity, except those H atoms within the inner cavity.

The strong interaction with methanesulfonate allowed isolation and crystallization the adducts $[n\text{-}Bu_4N][MeSO_3 \subset host]$, for host=4, and 6-8. FIG. 9A illustrates the molecular structure and relevant distances for $[MeSO_3 \subset 6]^-$. The three 0 atoms from the sulfonate group reside in the square plane described by the four electropositive HFX atoms, X=A–D. This sulfonate anion accommodation maximizes the $C_{Ar}$—H•••$O_{MeSO3}$— hydrogen bonding, with remarkably short C-to-O average distances of 3.31(4), 3.24(3), 3.18(7), and 3.34(6) A for 4, 6, 7, and 8 (FIG. 9B), respectively. The sum of the van der Waals radius for C and O is 3.22 Å. Fluorocages adopt a cone-shaped structure. To determine the expansion of this cone, the distances between rigid carbon atoms C6X were measured (FIG. 9A), X=A–D, which define an almost ideal square (C—$C_{square}$). Plotting these data together, a V-shaped trend is observed in the C-to-O distance, with 7 at the minimum, and no discernable correlation in C—$C_{square}$ distances (FIG. 9B), meaning that strengthening of the hydrogen bonds within the host's cavity requires only rotational movement of the aromatic flanking units as opposed to a breathing in or out distortion.

Figure 1C:
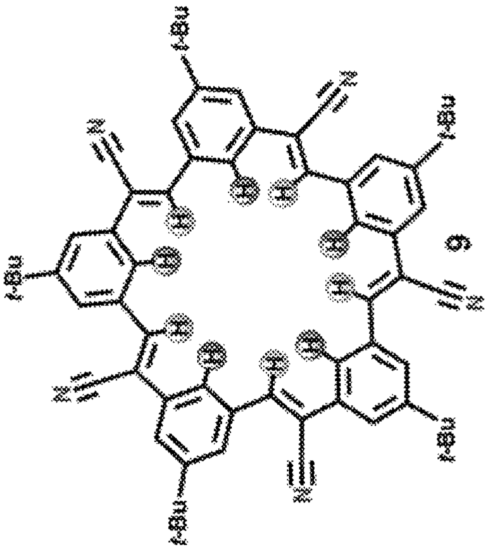
FIG. 1C illustrates DFT-calculated Hirshfeld charges for 1-10 (M06-2X/6-31+G(d,p) level of theory), circles represent $C_{Ar}$—H, squares represent $C_{CH2}$—H, triangles represent $C_{CC}$—H, and diamonds represent $C_{triazole}$—H hydrogen atoms correspond to those shown in FIG. 1A, or in the structural drawings in this figure, and wherein DFT calculations were carried out at ωB97XD/Def2SVP level of theory.
Figure 1C:
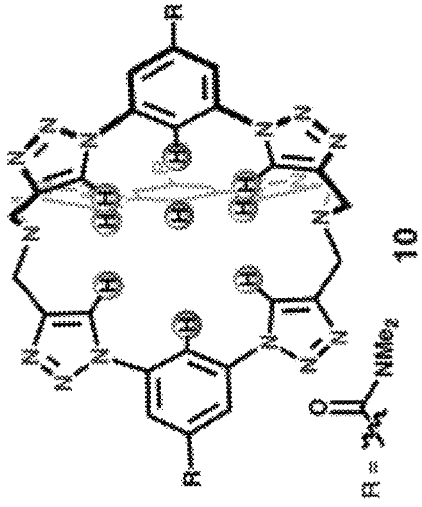
Figure 1C:
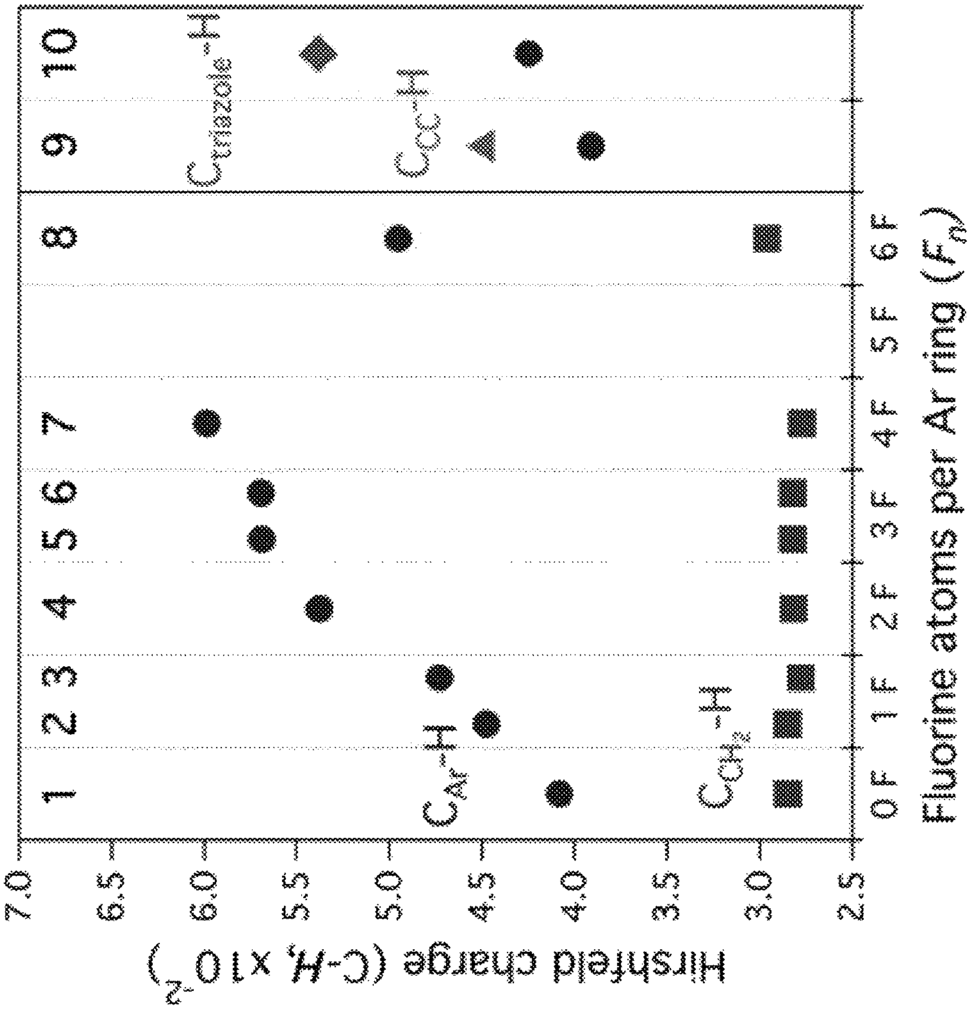

DFT-supported structure-function relationship. To gain insight into the trends observed in this family of fluorocages, DFT calculations (M06-2X/6-31+G (d,p) level of theory) in 1-8 were performed to obtain their Hirshfeld charges (HCs) in an effort to access quantitative data about the electropositivity of the H atoms involved in hydrogen bonding (FIG. 1C). HCs are recommended as they yield chemically meaningful partial charges. Following the series from 1 to 7, a monotonic increase in HC was observed at the H atoms in $C_{Ar}$—H (circles). Unexpectedly, the calculated HCs for fluorocage 8 reside in between those of 3 and 4. Notably, HCs for 8 explain its weaker binding of $[MeSO_3]^-$ compared to 4-7, even when to a first approximation one would intuitively predict 8 to be around the values seen for 4-7. The HC values for the hydrogen atoms in $C_{CH2}$—H (squared) are provided in FIG. 1C as control since these should not be affected by the nature of the EWG in the aromatic flanking unit. Overall, this trend correlates well with the binding affinity studies of 1-8, and with the metrics observed in the host-guest adducts $[n\text{-}Bu_4N][MeSO_3 \subset host]$, for host=4, and 6-8 (FIG. 8B). The HCs on 5 and 7 does not correlate well with their binding properties, which were attributed to the conformational distribution observed in the as-synthesized hosts and the large aromatic flanking unit rotational barrier (biaryl bond) of ~22 kcal/mol, compared to ~12 kcal/mol for all other hosts. In an effort to compare hosting capabilities of fluorocages with other rigid anion-binding hosts operating solely by C—H hydrogen bonding, two recent macrocyclic hosts reported in the literature were analyzed: 1) pentagonal cyanostar 9, capable of forming a strong 2:1 host:guest adduct with $Cl^-$ (40% MeOH/$CDCl_3$, $\beta \approx 10^8$ $M^{-2}$);[20] and 2) cryptand-like triazole cage 10, which binds $Cl^-$ remarkably strong ($CDCl_3$, $K_a \approx 10^{17}$ $M^{-1}$).[21] HCs of the H atoms involved in C—H hydrogen bonding increase from 9 to 10, as shown in FIG. 1C, supporting the relative trend observed in their anion binding properties. Furthermore, in the case of 10, the most electropositive H atoms reside in $C_{triazole}$—H and are on par to those found in fluorocage 4. However, while 4 has four of these electropositive H atoms, 10 has six of them making its internal cavity more electropositive. Most importantly, 5-7 display higher HCs relative to 10 suggesting that such fluorocages may provide record-setting affinities for anions of appropriate size to fit in the square planar geometry defined by the electropositive H atoms.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of chelating anions from a liquid including the anions, comprising:

contacting a composition comprising at least one macrocyclic moiety with the liquid, the at least one macrocyclic moiety being formed by providing an end group including a macrocyclic compound selected from the group consisting of a resorcin[n]arene wherein n is an integer between 4 and 8, a bridged resorcin[n']arene wherein n' is an integer between 4 and 8, a calix[n"]pyrrole-resorcin[n]arene wherein n" is 4, and a calix[n'"]arene wherein n'" is an integer between 4 and 6, wherein the macrocyclic compound is sufficiently rigid that it presents a plurality of functional groups extending from a first axial side of the macrocyclic compound, and reacting a plurality of reactive compounds with the plurality of functional groups extending from the first axial side of the macrocyclic compound, wherein each of the plurality of reactive compounds is a precursor for one of a plurality of groups conjugated to the macrocyclic compound to extend from the first axial side thereof, each of the plurality of groups conjugated to the macrocyclic compound including one or more electropositive C—H bond donor groups, H atoms of the C—H bond donor groups extending into a cavity of the at least one macrocyclic moiety, and at least one electron withdrawing substituent, wherein at least one of the one or more electropositive C—H bond donor groups of two or more of the plurality of groups interacts with one of the anions to form a chelate with the one of the anions.

2. The method of claim 1 wherein each of the plurality of groups including the one or more electropositive C—H bond donor groups is selected from the group consisting of an aromatic group and a heterocyclic aromatic group.

3. The method of claim 1 wherein each of the plurality of groups including the one or more electropositive C—H bond donor groups of the macrocyclic moiety are aromatic groups.

4. The method of claim 1 wherein the macrocyclic moiety exhibits an affinity toward anions that are non-spherical anions.

5. The method of claim 4 wherein the macrocyclic moiety exhibits an affinity for anions that are large anions.

6. The method of claim 5 wherein the macrocyclic moiety has an affinity for at least one of sulfonates and carboxylates.

7. The method claim 1 wherein a plurality of the macrocyclic moieties are immobilized upon a surface of a solid or covalently incorporated within a polymer.

8. The method of claim 1 wherein the plurality of groups including the one or more electropositive C—H bond donor groups are conformationally constrained.

9. The method of claim 1 wherein each of the plurality of groups including the one or more electropositive C—H bond donor groups has the formula:

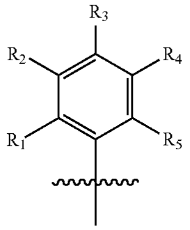

wherein each of $R_1$, $R_2$, $R_3$, $R_4$, and $R_5$ is independently selected from the group consisting of H and an electron withdrawing group, and wherein at least one of $R_1$, $R_2$, $R_3$, $R_4$, and $R_5$ is H.

10. The method of claim 9 wherein each of $R_1$, $R_2$, $R_3$, $R_4$, and $R_5$ is independently selected from the group consisting of H, F, CN, $NO_2$, $SO_2CF_3$, $NR_3$+, $SO_3H$, $SO_2R$, COR, $CO_2H$, $CO_2R$, $CONH_2$, CONHR, and $CONR_2$, wherein R is an alkyl group having one and up to 20 carbon atoms, or an aryl group with or without substituents, where substituents may include any one or combinations of the following groups F, CN, $NO_2$, $SO_2CF_3$, and wherein at least one of $R_1$, $R_2$, $R_3$, $R_4$, and $R_5$ is H.

11. The method of claim 9 wherein each of $R_1$, $R_2$, $R_3$, $R_4$, and $R_5$ is independently selected from the group consisting of H, F, CN, and $NO_2$, and wherein at least one of $R_1$, $R_2$, $R_3$, $R_4$, and $R_5$ is H.

12. The method of claim 1 wherein each of the plurality of groups including the electropositive C—H bond donor groups has the formula:

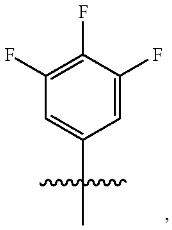
,
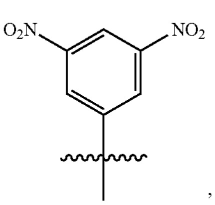
, or
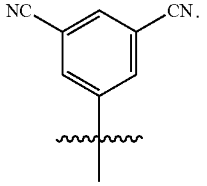

13. The method of claim 12 wherein the macrocyclic moiety is a resorcin[n]arene wherein n is 4.

14. The method of claim 1 wherein the macrocyclic compound is generally cylindrical or ellipsoidal.

15. The method of claim 1 wherein the macrocyclic compound comprise arene groups.

16. The method of claim 1 wherein the plurality of functional groups extending from the first axial side of the macrocyclic compound are selected from the group consisting of halide groups, boronate esters, and acetylenic groups.

17. The method of claim 1 wherein the macrocyclic compound further comprises a plurality of functional groups on a second axial side of the macrocyclic compound.

18. The method of claim 17 wherein the plurality of functional groups on the second axial side of the macrocyclic compound are selected from the group consisting of an alkyl group, an aryl group, an aldehyde group, an alkyl halide, an alcohol group, an ether group, an alkyl epoxide group, an olefinic group, an acetylenic group, carboxylic group, or a polymeric group.

19. The method of claim 17 wherein at least a portion of the plurality of functional groups on the second axial side of the macrocyclic compound are selected to react in a polymerization reaction.

20. The method of claim 1 wherein the macrocyclic compound is:

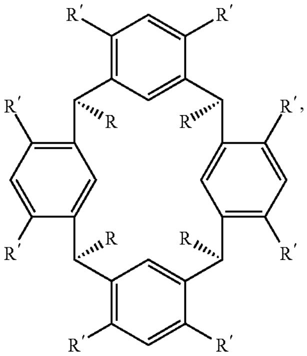
,
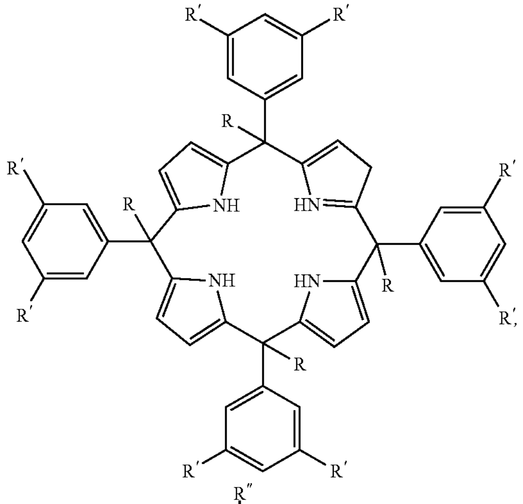
,
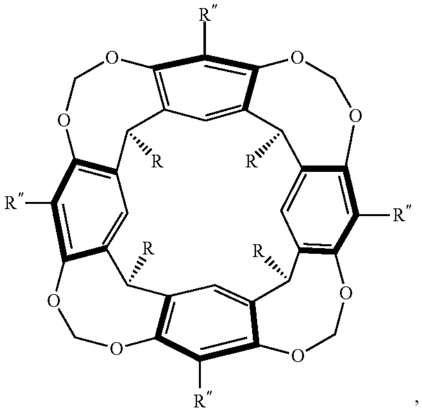
, or

-continued

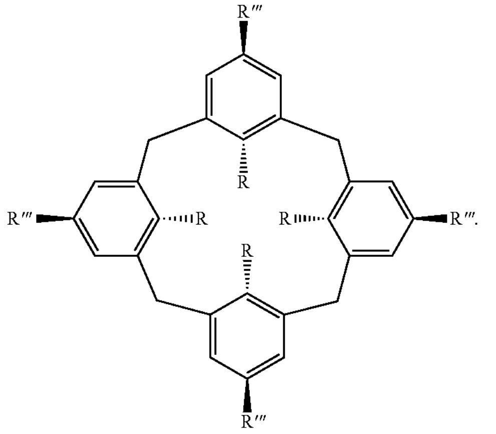

wherein R' is a hydroxyl group or an alkoxy, R" is a halide, a boronate ester group, an acetylenic group, an amine group, an amide group, a urea group, a thiourea group, an aldehyde group, or a carboxylic group, R"' is a halide group, a hydroxyl group, an alkoxy group, an amine group, an aldehyde group, an imine group, or a carboxylic group, and R is an alkyl group, an aryl group, an aldehyde group, an alkyl halide, an alcohol group, an ether group, an alkyl epoxide group, an olefinic group, an acetylenic group, a carboxylic group, or a polymeric group.

21. The method of claim 1 wherein the anions are perfluorinated compounds and polyfluorinated compounds.

22. The method of claim 1 wherein the at least one macrocyclic moiety also interact with neutral compounds to sequester a neutral compound.

23. The method of claim 1 wherein a plurality of the macrocyclic moieties of different ring size are immobilized upon a surface of a solid or covalently incorporated within a polymer to sequester anions of different size.

* * * * *